United States Patent [19]

Yamada et al.

[11] Patent Number: 5,789,877
[45] Date of Patent: Aug. 4, 1998

[54] POWER TRANSMITTING APPARATUS AND METHOD OF CONTROLLING THE SAME

[75] Inventors: Eiji Yamada, Owariasahi; Takao Miyatani, Toyota; Yasutomo Kawabata; Ryouji Mizutani, both of Aichi-ken; Akihiko Kanamori, Okazaki, all of Japan

[73] Assignee: Toyota Jidosha Kabushiki Kaisha, Toyota, Japan

[21] Appl. No.: 635,661

[22] Filed: Apr. 22, 1996

[30] Foreign Application Priority Data

May 19, 1995 [JP] Japan ................................. 7-145575
Aug. 29, 1995 [JP] Japan ................................. 7-245464

[51] Int. Cl.$^6$ ............................... H02K 7/10; B60K 1/00
[52] U.S. Cl. ................... 318/9; 318/432; 318/478; 60/39.06; 123/205; 123/357; 477/5; 364/431.051; 180/65.1
[58] Field of Search .................. 318/9, 11, 396, 318/379, 381, 995, 366, 49, 478, 78–79, 76, 87, 432–434; 477/5, 7, 15, 20, 30; 60/39.06; 364/424.1, 424.026, 426.01, 431.051; 74/845, 730, 61, 655 A; 180/65.1–65.4; 123/205, 338, 357

[56] References Cited

U.S. PATENT DOCUMENTS

| | | |
|---|---|---|
| 3,683,249 | 8/1972 | Shibata . |
| 3,789,281 | 1/1974 | Shibata . |
| 3,866,703 | 2/1975 | Eastham ............................ 180/65.1 |
| 4,335,429 | 6/1982 | Kawakatsu ......................... 180/65.2 |
| 5,085,101 | 2/1992 | Oldfield ............................ 74/730.1 |
| 5,498,216 | 3/1996 | Bitsche et al. ..................... 477/20 |
| 5,501,641 | 3/1996 | Kollermeyer et al. .............. 475/107 |

FOREIGN PATENT DOCUMENTS

| | | |
|---|---|---|
| 0 725 474 | 8/1996 | European Pat. Off. . |
| A-49-43311 | 4/1974 | Japan . |
| A-53-133814 | 11/1978 | Japan . |
| A-55-103100 | 8/1980 | Japan . |
| A-6-17727 | 1/1994 | Japan . |

*Primary Examiner*—John W. Cabeca
*Attorney, Agent, or Firm*—Oliff & Berridge, PLC

[57] ABSTRACT

A power transmitting apparatus (20) attached to a crankshaft (56) of an engine (50) includes a clutch motor (30), an assist motor (40), and a controller (80) for controlling the clutch motor (30) and the assist motor (40). When detecting an ignition switch in a starter position, the controller (80) makes a constant current flow through three-phase coils (44) of the assist motor (40) to fix a drive shaft (22) and makes a current flow through three-phase coils (36) of the clutch motor (30) to enable the clutch motor (30) to apply a starter torque TST to the crankshaft (56). This results in cranking the crankshaft (56). Concurrently with the cranking process, fuel injection into the engine (50) and spark ignition are controlled to start the engine (50).

18 Claims, 16 Drawing Sheets

POWER TRANSMITTING APPARATUS AND METHOD OF CONTROLLING THE SAME

BACKGROUND OF THE INVENTION

1. Field of the Invention

The present invention relates to a power transmitting apparatus and a method of controlling the same. More specifically the invention pertains to a power transmitting apparatus for starting an engine and transmitting a power output from the engine to a drive shaft, and also to a method of controlling such a power transmitting apparatus in the course of starting the engine.

2. Description of the Related Art

In known power transmitting apparatus mounted on a vehicle, an output shaft of an engine is electromagnetically connected to a drive shaft, which is linked with a rotor of a motor, via an electromagnetic coupling, so that power of the engine is transmitted to the drive shaft (for example, JAPANESE PATENT LAYING-OPEN GAZETTE No. 49-43311). In other known power transmitting apparatus, after the motor is activated to drive the vehicle under the condition that the connection of the electromagnetic coupling is released, an exciting current is supplied to the electromagnetic coupling in order to resume the connection of the electromagnetic coupling, thereby cranking the output shaft of the engine and starting the engine (for example, JAPANESE PATENT LAYING-OPEN GAZETTE No. 53-133814 and No. 55-103100).

In recently proposed power transmitting apparatus wherein an output shaft of an engine and a drive shaft linked with a rotor of a motor are connected to each other via a clutch and a transmission, after the motor is activated to drive the vehicle under the condition that the connection of the clutch is released, the connection of the clutch is resumed to crank the output shaft of the engine and start the engine (for example, JAPANESE PATENT LAYING-OPEN GAZETTE No. 6-17727). This proposed apparatus increases the torque command value of the motor in the course of cranking operation, thereby decreasing a fall of the output torque to wheels due to the cranking operation and reducing the torque shock.

Such known power transmitting apparatus can start the engine only after the vehicle is driven by the motor. Secondary cells are generally used as a power source for supplying a power required to drive the vehicle by the motor. The secondary cells, which have been left or used for a long time, have a less dischargeable power and may not supply the power sufficient to drive the vehicle by the motor. Under these conditions, the principle of the conventional power transmitting apparatus can not be applied to start the engine.

In the power transmitting apparatus disclosed in JAPANESE PATENT LAYING-OPEN GAZETTE No. 6-17727, the torque command value of the motor is increased in the course of cranking operation, in order to decrease a fall of the output torque to wheels and reduce the torque shock. The increase in torque command value is a fixed amount, which does not coincide with the torque required for cranking and varied depending upon the vehicle speed and the selected gear position in the transmission. This results in variation in output torque to wheels and insufficient absorption of the torque shock. In this power transmitting apparatus, it is required to set the revolving speed of the started engine equal to the revolving speed of the output shaft of the clutch. Compared with the minimum revolving speed at which the engine can stably rotate (that is, the revolving speed at an idle), the revolving speed set as above requires a greater torque for cranking. This undesirably enhances a fall of the output torque and augments the torque shock.

SUMMARY OF THE INVENTION

One object of the invention is thus to provide a power transmitting apparatus which can start an engine while a drive shaft is in non-rotating state, and also to a method of controlling such a power transmitting apparatus.

Another object of the invention is to provide a power transmitting apparatus which can start an engine without varying the power applied to a drive shaft while the drive shaft is driven to rotate with the power stored in the power transmitting apparatus, and also to a method of controlling such a power transmitting apparatus.

The above and other related objects are realized at least partly by a first power transmitting apparatus for starting an engine and transmitting a power output from the engine to a drive shaft. The first power transmitting apparatus of the invention comprises: a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a clutch motor-driving circuit for controlling a degree of the electromagnetic connection of the first and second rotors of the clutch motor and regulating rotation of the second rotor relative to the first rotor; an assist motor connected with the drive shaft; an assist motor-driving circuit for driving and controlling the assist motor; a storage battery being charged with power regenerated by the clutch motor via the clutch motor-driving circuit, being charged with power regenerated by the assist motor via the assist motor-driving circuit, discharging power required to drive the clutch motor via the clutch motor-driving circuit, and discharging power required to drive the assist motor via the assist motor-driving circuit; starter position detecting means for detecting an ignition switch in a starter position; starter control means for, when the starter position detecting means detects the ignition switch in the starter position, setting the drive shaft into a locking state and controlling the clutch motor-driving circuit to allow the clutch motor to crank the output shaft of the engine with the power stored in the storage battery; and engine operation control means for injecting a fuel into the engine and igniting a spark in the engine concurrently with the cranking operation by the starter control means.

The first power transmitting apparatus of the invention can effect cranking of the output shaft of the engine without any additional starter motor. After the engine starts, the power of the engine is transmitted to the drive shaft through the torque conversion.

In accordance with one aspect of the first power output apparatus, the starter control means comprises means for setting the drive shaft into the locking state by locking up the assist motor with the power stored in the storage battery. In accordance with another aspect of the first power output apparatus, the starter control means comprises means for utilizing the power stored in the storage battery to make the assist motor output a torque, which is substantially equivalent to a torque applied from the clutch motor to the output shaft of the engine, to the drive shaft concomitantly by the cranking operation, thereby setting the drive shaft into the locking state.

The invention is also directed to a second power transmitting apparatus for starting an engine and transmitting a power output from the engine to a drive shaft. The second power transmitting apparatus comprises: a complex motor comprising a first rotor connected with the output shaft of the engine, a second rotor connected with the drive shaft being coaxial to and rotatable relative to the first rotor, and a stator for rotating the second rotor, the first rotor and the second rotor constituting a first motor, the second rotor and the stator constituting a second motor; a first motor-driving circuit for driving and controlling the first motor in the complex motor; a second motor-driving circuit for driving and controlling the second motor in the complex motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; starter position detecting means for detecting an ignition switch in a starter position; starter control means for, when the starter position detecting means detects the ignition switch in the starter position, setting the drive shaft into a locking state and controlling the first motor-driving circuit to allow the first motor to crank the output shaft of the engine with the power stored in the storage battery; and engine operation control means for injecting a fuel into the engine and igniting a spark in the engine concurrently with the cranking operation by the starter control means.

The second power transmitting apparatus of the invention can effect cranking of the output shaft of the engine without any additional starter motor. After the engine starts, the power of the engine is transmitted to the drive shaft through the torque conversion.

In accordance with one aspect, the invention is further directed to a third power transmitting apparatus for starting an engine and transmitting a power output from the engine to a drive shaft. The third power transmitting apparatus comprises: a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a clutch motor-driving circuit for controlling a degree of the electromagnetic connection of the first and second rotors of the clutch motor and regulating rotation of the second rotor relative to the first rotor; an assist motor connected with the drive shaft; an assist motor-driving circuit for driving and controlling the assist motor; a storage battery being charged with power regenerated by the clutch motor via the clutch motor-driving circuit, being charged with power regenerated by the assist motor via the assist motor-driving circuit, discharging power required to drive the clutch motor via the clutch motor-driving circuit, and discharging power required to drive the assist motor via the assist motor-driving circuit; a clutch mounted on the drive shaft to receive an output of the assist motor, the clutch connecting and disconnecting transmission of the output; starter position detecting means for detecting an ignition switch in a starter position; cranking control means for, when the starter position detecting means detects the ignition switch in the starter position, releasing the connection of the clutch, controlling the assist motor-driving circuit to enable the assist motor to output a torque to the drive shaft with the power stored in the storage battery, and controlling the clutch motor-driving circuit to enable the clutch motor to transmit the torque, which is output from the assist motor to the drive shaft, to the output shaft of the engine and thereby cranking the output shaft of the engine; and engine operation control means for injecting a fuel into the engine and igniting a spark in the engine concurrently with the cranking operation by the cranking control means.

In the third power transmitting apparatus of the invention, the torque output from the assist motor is transmitted by the clutch motor and used to crank the output shaft of the engine. After the engine starts, the power of the engine is transmitted to the drive shaft through the torque conversion.

In accordance with one aspect of the first power output apparatus, the cranking control means comprises means for locking up the clutch motor to transmit the torque output from the assist motor to the output shaft of said engine.

In accordance with still another aspect, the invention is also directed to a fourth power transmitting apparatus for starting an engine and transmitting a power output from the engine to a drive shaft. The fourth power transmitting apparatus comprises: a complex motor comprising a first rotor connected with the output shaft of the engine, a second rotor connected with the drive shaft being coaxial to and rotatable relative to the first rotor, and a stator for rotating the second rotor, the first rotor and the second rotor constituting a first motor, the second rotor and the stator constituting a second motor; a first motor-driving circuit for driving and controlling the first motor in the complex motor; a second motor-driving circuit for driving and controlling the second motor in the complex motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; a clutch mounted on the drive shaft to receive an output of the complex motor, the clutch connecting and disconnecting transmission of the output; starter position detecting means for detecting an ignition switch in a starter position; cranking control means for, when the starter position detecting means detects the ignition switch in the starter position, releasing the connection of the clutch, controlling the second motor-driving circuit to enable the second motor to output a torque to the drive shaft with the power stored in the storage battery, and controlling the first motor-driving circuit to enable the first motor to transmit the torque, which is output from the second motor to the drive shaft, to the output shaft of the engine and thereby cranking the output shaft of the engine; and engine operation control means for injecting a fuel into the engine and igniting a spark in the engine concurrently with the cranking operation by the cranking control means.

The fourth power transmitting apparatus of the invention effects cranking of the output shaft of the engine with the first motor and the second motor. After the engine starts, the power of the engine is transmitted to the drive shaft through the torque conversion. The structure including the first motor and the second motor integrally joined with each other realizes a compact power transmitting apparatus.

In accordance with one aspect, the invention is also directed to a fifth power transmitting apparatus for starting an engine and transmitting a power output from the engine to a drive shaft. The fifth power transmitting apparatus comprises: a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a clutch motor-driving circuit for controlling a degree of the electromagnetic connection of the first and second rotors of the clutch motor and regulating rotation of the second rotor relative to the first rotor; an assist motor connected with the drive shaft; an assist motor-driving circuit for driving and controlling the assist motor; a storage battery being charged with power regenerated by the clutch motor via the clutch motor-driving circuit, being charged with power regenerated by the assist motor via the assist motor-driving circuit, discharging power required to drive the clutch motor via the clutch motor-driving circuit, and discharging power required to drive the assist motor via the assist motor-driving circuit; cranking control means for controlling the clutch motor-driving circuit to allow the clutch motor to crank the output shaft of the engine with the power stored in the storage battery, in response to an engine start signal which the cranking control means receives while the assist motor driving and rotating the drive shaft with the power stored in the storage battery under a non-driving condition of the engine; power increase means for controlling the assist motor-driving circuit to increase additional power supplied from the assist motor to the drive shaft by an amount corresponding to a torque substantially equivalent to a torque applied from the clutch motor to the output shaft of the engine, concurrently with the cranking operation by the cranking control means; and engine operation control means for injecting a fuel into the engine and igniting a spark in the engine concurrently with the cranking operation by the cranking control means.

The fifth power transmitting apparatus of the invention can start the engine while the drive shaft is driven to rotate by the assist motor. The additional power supplied from the assist motor to the drive shaft is increased by an amount corresponding to the torque required for cranking. This effectively reduces the torque shock occurring on the drive shaft due to the cranking operation.

In accordance with another aspect, the invention is directed to a sixth power transmitting apparatus for starting an engine and transmitting a power output from the engine to a drive shaft. The sixth power transmitting apparatus comprises: a complex motor comprising a first rotor connected with the output shaft of the engine, a second rotor connected with the drive shaft being coaxial to and rotatable relative to the first rotor, and a stator for rotating the second rotor, the first rotor and the second rotor constituting a first motor, the second rotor and the stator constituting a second motor; a first motor-driving circuit for driving and controlling the first motor in the complex motor; a second motor-driving circuit for driving and controlling the second motor in the complex motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; cranking control means for controlling the first motor-driving circuit to allow the first motor to crank the output shaft of the engine with the power stored in the storage battery, in response to an engine start signal which the cranking control means receives while the second motor driving and rotating the drive shaft with the power stored in the storage battery under a non-driving condition of the engine; power increase means for controlling the second motor-driving circuit to increase additional power supplied from the second motor to the drive shaft by an amount corresponding to a torque substantially equivalent to a torque applied from the first motor to the output shaft of the engine, concurrently with the cranking operation by the cranking control means; and engine operation control means for injecting a fuel into the engine and igniting a spark in the engine concurrently with the cranking operation by the cranking control means.

The sixth power transmitting apparatus of the invention can start the engine while the drive shaft is driven to rotate by the second motor. The additional power supplied from the second motor to the drive shaft is increased by an amount corresponding to the torque required for cranking. This effectively reduces the torque shock occurring on the drive shaft due to the cranking operation. The structure including the first motor and the second motor integrally joined with each other realizes a compact power transmitting apparatus.

In accordance with one aspect, the invention provides a seventh power transmitting apparatus for starting an engine and transmitting a power output from the engine to a drive shaft. The seventh power transmitting apparatus comprises: a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a clutch motor-driving circuit for controlling a degree of the electromagnetic connection of the first and second rotors of the clutch motor and regulating rotation of the second rotor relative to the first rotor; an assist motor connected with the output shaft of the engine; an assist motor-driving circuit for driving and controlling the assist motor; a storage battery being charged with power regenerated by the clutch motor via the clutch motor-driving circuit, being charged with power regenerated by the assist motor via the assist motor-driving circuit, discharging power required to drive the clutch motor via the clutch motor-driving circuit, and discharging power required to drive the assist motor via the assist motor-driving circuit; starter position detecting means for detecting an ignition switch in a starter position; starter control means for, when the starter position detecting means detects the ignition switch in the starter position, controlling the assist motor-driving circuit to allow the assist motor to crank the output shaft of the engine with the power stored in the storage battery; and engine operation control means for injecting a fuel into the engine and igniting a spark in the engine concurrently with the cranking operation by the starter control means.

The seventh power transmitting apparatus of the invention can effect cranking of the output shaft of the engine without any additional starter motor. After the engine starts, the power of the engine is transmitted to the drive shaft through the torque conversion.

In accordance with another aspect, the invention provides a eighth power transmitting apparatus for starting an engine and transmitting a power output from the engine to a drive shaft. The eighth power transmitting apparatus comprises: a complex motor comprising a first rotor connected with an output shaft of the engine, a second rotor connected with the drive shaft being coaxial to and rotatable relative to the first rotor, and a stator for rotating the second rotor, the first rotor and the second rotor constituting a first motor, the first rotor and the stator constituting a second motor; a first motor-driving circuit for driving and controlling the first motor in the complex motor; a second motor-driving circuit for driving and controlling the second motor in the complex motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; starter position detecting means for detecting an ignition switch in a starter position; starter control means for, when the starter position detecting means detects the ignition switch in the starter position, controlling the second motor-driving circuit to allow the second motor to crank the output shaft of the engine with the power stored in the storage battery; and engine operation control means for injecting a fuel into the engine and igniting a spark in the engine concurrently with the cranking operation by the starter control means.

The eighth power transmitting apparatus of the invention can effect cranking of the output shaft of the engine without any additional starter motor but with the second motor of the complex motor. After the engine starts, the power of the engine is transmitted to the drive shaft through the torque conversion. The structure including the first motor and the second motor integrally joined with each other realizes a compact power transmitting apparatus.

In accordance with another aspect, the invention is directed to an ninth power transmitting apparatus for starting an engine and transmitting a power output from the engine to a drive shaft. The ninth power transmitting apparatus comprises: a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a clutch motor-driving circuit for controlling a degree of the electromagnetic connection of the first and second rotors of the clutch motor and regulating rotation of the second rotor relative to the first rotor; an assist motor connected with the output shaft of the engine; an assist motor-driving circuit for driving and controlling the assist motor; a storage battery being charged with power regenerated by the clutch motor via the clutch motor-driving circuit, being charged with power regenerated by the assist motor via the assist motor-driving circuit, discharging power required to drive the clutch motor via the clutch motor-driving circuit, and discharging power required to drive the assist motor via the assist motor-driving circuit; lock means for setting the drive shaft into a locking state; starter position detecting means for detecting an ignition switch in a starter position; cranking control means for, when the starter position detecting means detects the ignition switch in the starter position, activating the lock means to set the drive shaft into the locking state and controlling the clutch motor-driving circuit to allow the clutch motor to crank the output shaft of the engine with the power stored in the storage battery; and engine operation control means for injecting a fuel into the engine and igniting a spark in the engine concurrently with the cranking operation by the cranking control means.

The ninth power transmitting apparatus of the invention effects cranking of the output shaft of the engine with the clutch motor.

In accordance with still another aspect, the invention is directed to a tenth power transmitting apparatus for starting an engine and transmitting a power output from the engine to a drive shaft. The tenth power transmitting apparatus comprises: a complex motor comprising a first rotor connected with an output shaft of the engine, a second rotor connected with the drive shaft being coaxial to and rotatable relative to the first rotor, and a stator for rotating the second rotor, the first rotor and the second rotor constituting a first motor while the first rotor and the stator constituting a second motor; a first motor-driving circuit for driving and controlling the first motor in the complex motor; a second motor-driving circuit for driving and controlling the second motor in the complex motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; lock means for setting the drive shaft into a locking state; starter position detecting means for detecting an ignition switch in a starter position; cranking control means for, when the starter position detecting means detects the ignition switch in the starter position, activating the lock means to set the drive shaft into the locking state and controlling the first motor-driving circuit to allow the first motor to crank the output shaft of the engine with the power stored in the storage battery; and engine operation control means for injecting a fuel into the engine and igniting a spark in the engine concurrently with the cranking operation by the cranking control means.

The tenth power transmitting apparatus of the invention effects cranking of the output shaft of the engine with the first motor of the complex motor. The structure including the first motor and the second motor integrally joined with each other realizes a compact power transmitting apparatus.

In accordance with another aspect, the invention further provides a eleventh power transmitting apparatus for starting an engine and transmitting a power output from the engine to a drive shaft. The eleventh power transmitting comprises: a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a clutch motor-driving circuit for controlling a degree of the electromagnetic connection of the first and second rotors of the clutch motor and regulating rotation of the second rotor relative to the first rotor; an assist motor connected with the output shaft of the engine; an assist motor-driving circuit for driving and controlling the assist motor; a storage battery being charged with power regenerated by the clutch motor via the clutch motor-driving circuit, being charged with power regenerated by the assist motor via the assist motor-driving circuit, discharging power required to drive the clutch motor via the clutch motor-driving circuit, and discharging power required to drive the assist motor via the assist motor-driving circuit; engine stop-time driving control means for controlling the assist motor-driving circuit to allow the assist motor to lock the output shaft of the engine with the power stored in the storage battery, and controlling the clutch motor-driving circuit to allow the clutch motor to drive and rotate the drive shaft with the power stored in the storage battery, thereby driving and rotating the drive shaft under a non-driving condition of the engine; cranking control means for controlling the assist motor-driving circuit to allow the assist motor to crank the output shaft of the engine with the power stored in the storage battery, in place of the control of the assist motor-driving circuit by the engine stop-time driving control means, in response to an engine start signal which the cranking control means receives during the course of the control by the engine stop-time driving control means; and engine operation control means for injecting a fuel into the engine and igniting a spark in the engine concurrently with the cranking operation by the cranking control means.

The eleventh power transmitting apparatus of the invention can start the engine with the power stored in the secondary cell under the non-driving condition of the engine, while the drive shaft is driven to rotate.

In accordance with still another aspect, the invention provides an twelfth power transmitting apparatus for starting an engine and transmitting a power output from the engine to a drive shaft. The twelfth power transmitting apparatus comprises: a complex motor comprising a first rotor connected with an output shaft of the engine, a second rotor connected with the drive shaft being coaxial to and rotatable relative to the first rotor, and a stator for rotating the second rotor, the first rotor and the second rotor constituting a first motor while the first rotor and the stator constituting a second motor; a first motor-driving circuit for driving and controlling the first motor in the complex motor; a second motor-driving circuit for driving and controlling the second motor in the complex motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; engine stop-time driving control means for controlling the second motor-driving circuit to allow the second motor to lock the output shaft of the engine with the power stored in the storage battery, and controlling the first motor-driving circuit to allow the first motor to drive and rotate the drive shaft with the power stored in the storage battery, thereby driving and rotating the drive shaft under a non-driving condition of the engine; cranking control means for controlling the second motor-driving circuit to allow the second motor to crank the output shaft of the engine with the power stored in the storage battery, in place of the control of the second motor-driving circuit by the engine stop-time driving control means, in response to an engine start signal which the cranking control means receives during the course of the control by the engine stop-time driving control means; and engine operation control means for injecting a fuel into the engine and igniting a spark in the engine concurrently with the cranking operation by the cranking control means.

The twelfth power transmitting apparatus of the invention can start the engine with the power stored in the secondary cell under the non-driving condition of the engine, while the drive shaft is driven to rotate. The structure including the first motor and the second motor integrally joined with each other realizes a compact power transmitting apparatus.

The objects of the invention are also realized at least partly by a first method of controlling a power transmitting apparatus for transmitting a power output from an engine to a drive shaft. The first method comprises the steps of: (a) providing a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; an assist motor connected with the drive shaft; a storage battery being charged with power regenerated by the clutch motor, being charged with power regenerated by the assist motor, discharging power required to drive the clutch motor, and discharging power required to drive the assist motor; and an engine operation means for injecting a fuel into the engine and igniting a spark in the engine; (b) detecting an ignition switch in a starter position; (c) setting the drive shaft into a locking state when the ignition switch is detected in the starter position; (d) cranking the output shaft of the engine by the clutch motor with the power stored in the storage battery; and (e) controlling the fuel injection into the engine and the spark ignition in the engine via the engine operation means concurrently with the cranking operation of the step (d).

The first method of the invention effects cranking of the output shaft of the engine without any additional starter motor.

In accordance with one aspect, the invention is directed to a second method of controlling a power transmitting apparatus for transmitting a power output from an engine to a drive shaft. The second method comprises the steps of: (a) providing a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; an assist motor connected with the drive shaft; a storage battery being charged with power regenerated by the clutch motor, being charged with power regenerated by the assist motor, discharging power required to drive the clutch motor, and discharging power required to drive the assist motor; an engine operation means for injecting a fuel into the engine and igniting a spark in the engine; and a clutch mounted on the drive shaft to receive an output of the assist motor, the clutch connecting and disconnecting transmission of the output; (b) detecting an ignition switch in a starter position; (c) releasing the connection of the clutch when the ignition switch is detected in the starter position; (d) controlling the assist motor to output a torque to the drive shaft with the power stored in the storage battery; (e) controlling the clutch motor to transmit the torque, which is output from the assist motor to the drive shaft, to the output shaft of the engine and thereby cranking the output shaft of the engine; and (f) controlling the fuel injection into the engine and the spark ignition in the engine via the engine operation means concurrently with the cranking operation of the step (e).

The second method of the invention enables the clutch motor to transmit the torque output from the assist motor, which is used to crank the output shaft of the engine.

In accordance with another aspect, the invention is further directed to a third method of controlling a power transmitting apparatus for transmitting a power output from an engine to a drive shaft. The third method comprises the steps of: (a) providing a clutch motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; an assist motor connected with the drive shaft; a storage battery being charged with power regenerated by the clutch motor, being charged with power regenerated by the assist motor, discharging power required to drive the clutch motor, and discharging power required to drive the assist motor; and an engine operation means for injecting a fuel into the engine and igniting a spark in the engine; (b) cranking the output shaft of the engine by the clutch motor with the power stored in the storage battery, when an engine start signal is detected while the assist motor driving and rotating the drive shaft with the power stored in the storage battery under a non-driving condition of the engine; (c) increasing additional power supplied from the assist motor to the drive shaft by an amount corresponding to a torque substantially equivalent to a torque applied from the clutch motor to the output shaft of the engine, concurrently with the cranking operation of the step (b); and (d) controlling the fuel injection into the engine and the spark ignition in the engine via the engine operation means concurrently with the cranking operation of the step (b).

The third method of the invention can start the engine while the drive shaft is driven to rotate by the assist motor. The additional power supplied from the assist motor to the drive shaft is increased by an amount corresponding to the torque required for cranking. This effectively reduces the torque shock occurring on the drive shaft due to the cranking operation.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
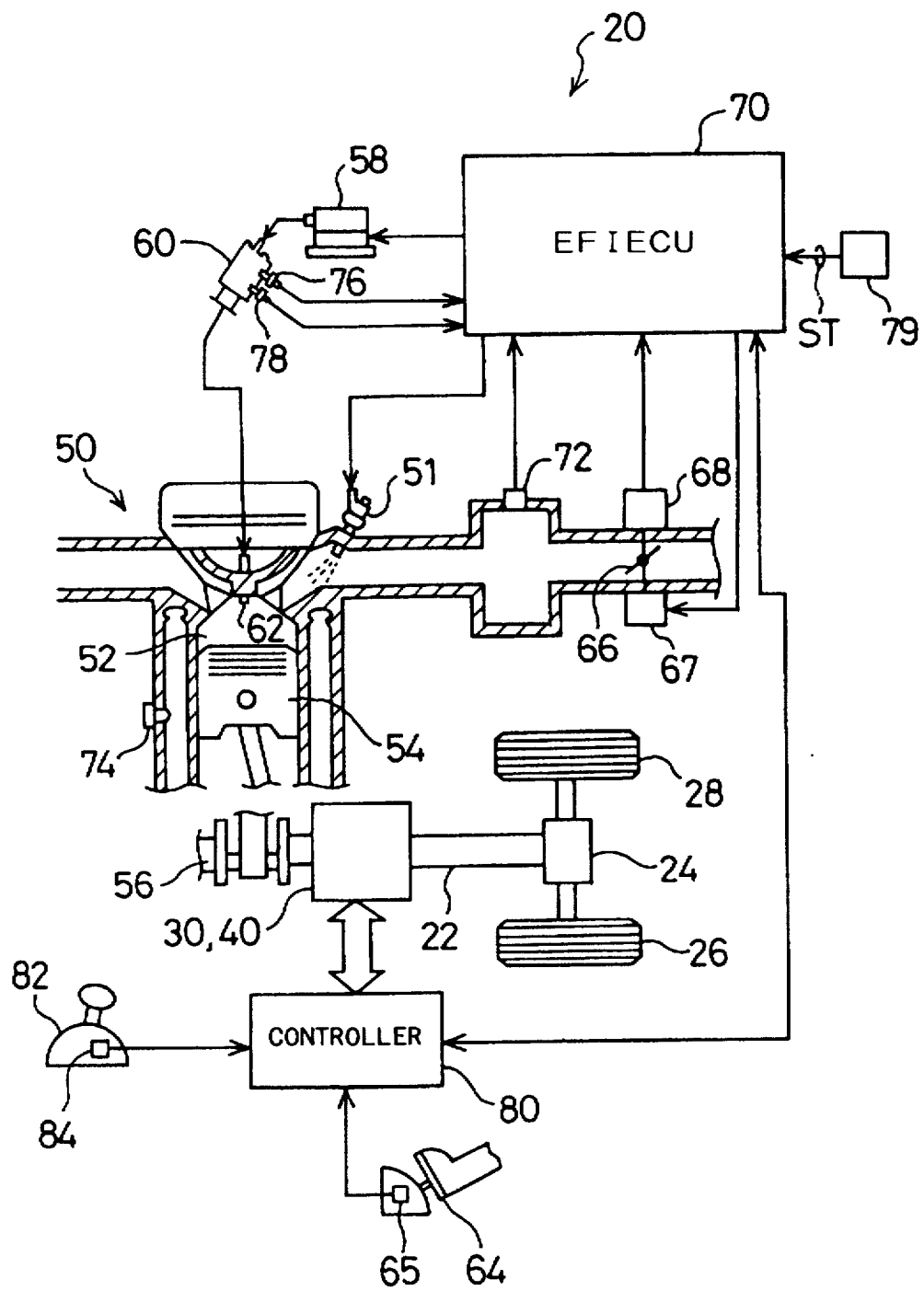
FIG. 1 is a schematic view illustrating a power transmitting apparatus 20 embodying the present invention mounted on a vehicle.

FIG. 1 schematically illustrates a power transmitting apparatus 20 embodying the present invention, which is coupled with an engine 50 and mounted on a vehicle. The power transmitting apparatus 20 includes an electronic control unit (hereinafter referred to as EFIECU) 70 for activating and controlling the engine 50, a clutch motor 30 and an assist motor 40 linked with a crankshaft 56 of the engine 50, and a controller 80 for driving and controlling the clutch motor 30 and the assist motor 40. Details of the respective elements are described below.

The engine 50 used here is a gasoline engine driven by gasoline. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of the crankshaft 56. The throttle valve 66 is driven to open and close by an actuator 67. An ignition plug 62 converts a high voltage applied from an igniter 58 via a distributor 60 to a spark, which explosively ignites and combusts the air/fuel mixture.

Operation of the engine 50 is controlled by the EFIECU 70 as described previously. The EFIECU 70 receives information from various sensors, which detect the operating conditions of the engine 50. These sensors include a throttle valve position sensor 68 for detecting the position of the throttle valve 66, a manifold vacuum sensor 72 for measuring a load applied to the engine 50, a water temperature sensor 74 for measuring the water temperature in the engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The clutch motor 30 and the assist motor 40 linked with the crankshaft 56 of the engine 50 are further connected to a differential gear 24 via drive shaft 22. Power output from the engine 50 is eventually transmitted to left and right driving wheels 26 and 28 through this connection. The controller 80 for driving and controlling the clutch motor 30 and the assist motor 40 includes a control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Figure 2:
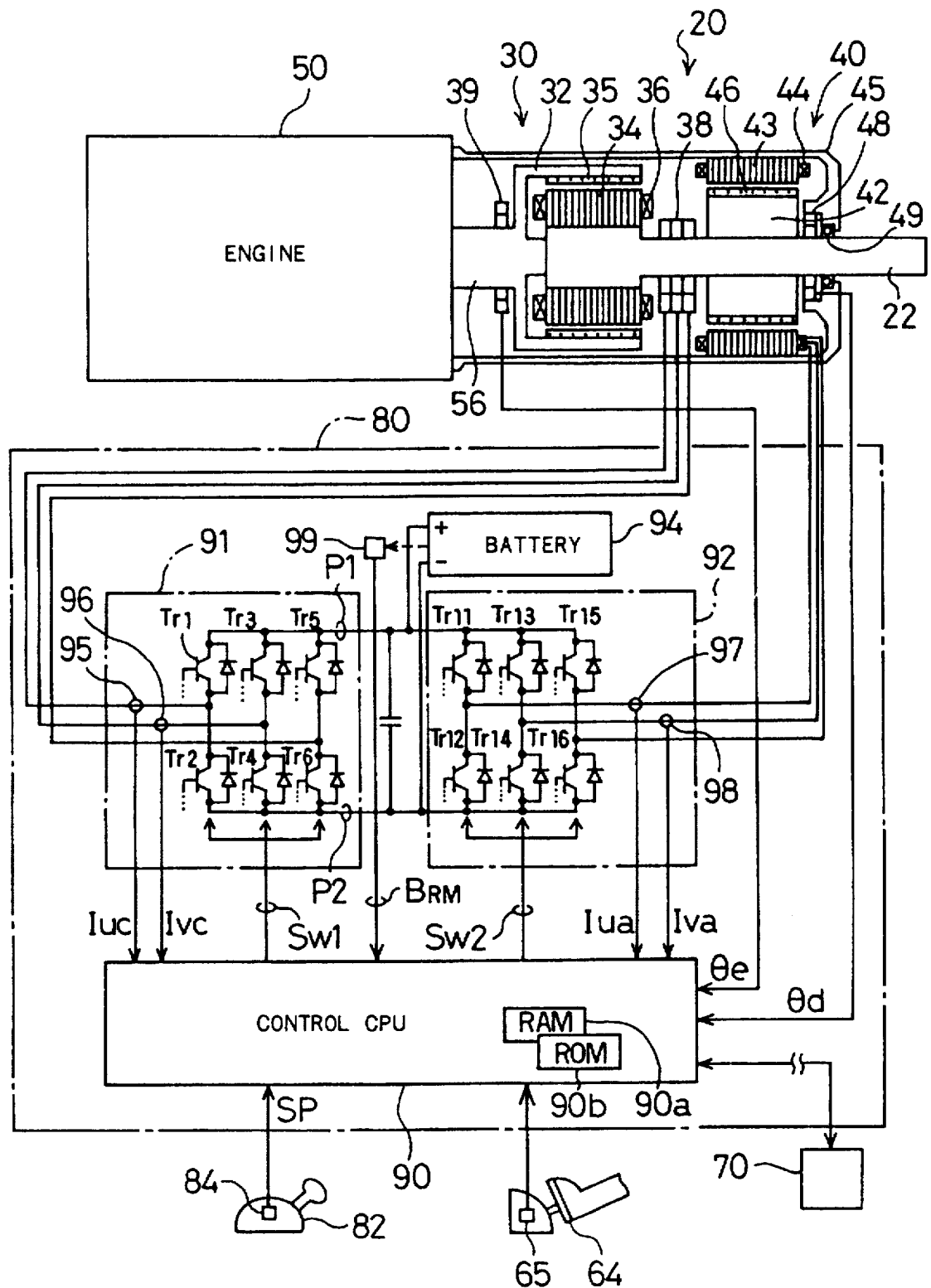
FIG. 2 is a schematic view illustrating structure of the power transmitting apparatus 20.
Figure 3:
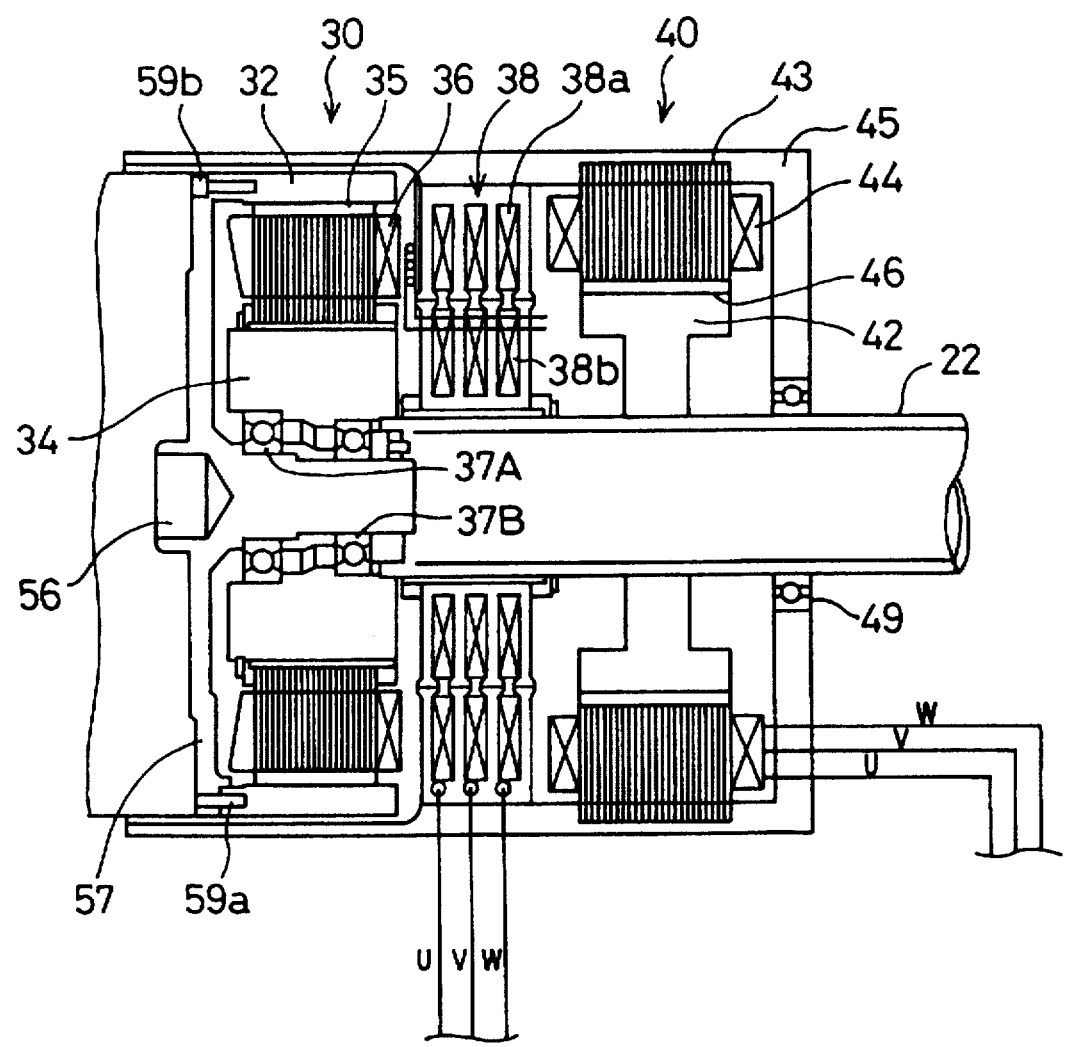
FIG. 3 is a cross sectional view illustrating structure of a clutch motor 30 and an assist motor 40 included in the power transmitting apparatus 20 of FIG. 2.

FIG. 2 schematically shows structure of the power transmitting apparatus 20; and FIG. 3 is a cross sectional view illustrating the clutch motor 30 and the assist motor 40 included in the power transmitting apparatus 20. As clearly seen in FIG. 2, the power transmitting apparatus 20 includes the clutch motor 30 having an outer rotor 32 and an inner rotor 34 and the assist motor 40 having a rotor 42. The outer rotor 32 of the clutch motor 30 is mechanically linked with the crankshaft 56 of the engine 50, whereas the inner rotor 34 thereof is mechanically linked with the rotor 42 of the assist motor 40.

Referring to FIG. 2, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A laminated sheet of non-directional electromagnetic steel is used to form teeth and slots for the three-phase coils 36 in the inner rotor 34. A resolver 39 for measuring a rotational angle θe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power transmitting apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the rotation and axial torque of the crankshaft 56 of the engine 50 are transmitted via the outer rotor 32 to the inner rotor 34 of the clutch motor 30, the rotation and torque by the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 3. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38a fixed to the casing 45 and secondary windings 38b attached to the drive shaft 22 coupled with the inner rotor 34. Electromagnetic induction allows electric power to be transmitted from the primary windings 38a to the secondary windings 38b or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 2, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data through the input/output port. The input data include a rotational angle θe of the crankshaft 56 of the engine 50 from the resolver 39, a rotational angle θd of the drive shaft 22 from the resolver 48, an accelerator pedal position AP (pressing amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two ammeters 97 and 98 in the second driving circuit 92, and a residual capacity BRM of the battery 94 from a residual capacity meter 99. The residual capacity meter 99 may determine the residual capacity BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

Figure 4:
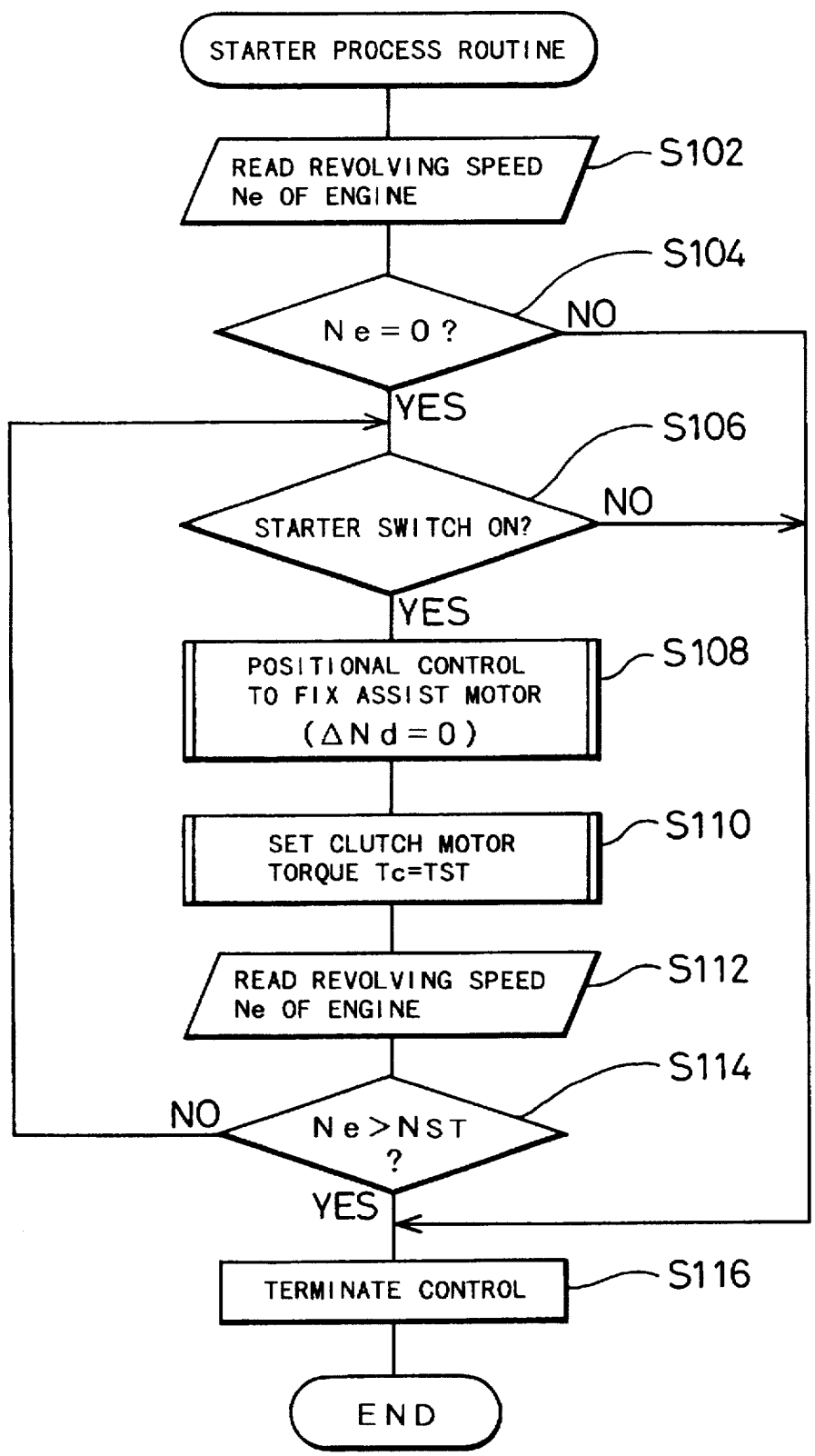
FIG. 4 is a flowchart showing a starter process routine executed by the controller 80.

The power transmitting apparatus 20 thus constructed is operated in the following manner. When a driver operates the starter switch 79 under the non-driving condition of the engine 50 to start the vehicle, the EFIECU 70 perceives the operation of the starter switch 79, controls the fuel injection into the engine 50 and ignition with the igniter 58 in combination with the cranking process by the controller 80 (described later), and sends a starting command to the controller 80 through communication. The control CPU 90 of the controller 80 receives the starting command and executes the starter control based on a starter process routine illustrated in the flowchart of FIG. 4.

When the program enters the starter process routine, the control CPU 90 first receives data of revolving speed Ne of the engine 50 from the resolver 39 at step S102 and determines whether the input revolving speed Ne is equal to zero at step S104. When the revolving speed Ne of the engine 50 is not equal to zero at the time point when this routine starts, the program recognizes the non-necessity of the starter control and proceeds to step S116, at which the control CPU 90 stops the control procedure and exits from the routine. When the revolving speed Ne of the engine 50 is equal to zero at the time point when this routine starts, on the contrary, the program recognizes the necessity of starter control and goes to step S106. The control CPU 90 reconfirms the ON-position of the starter switch 79 through the communication with the EFIECU 70 at step S106. When the starter switch 79 is turned off during the starter process, the program goes to step S116 to stop the control.

After reconfirming the ON-position of the starter switch 79, the control CPU 90 fixes the assist motor 40, or more concretely controls the position of the rotor 42 of the assist motor 40 to prevent the drive shaft 22 from rotating at step S108. When the clutch motor 30 applies a starter torque TST to the crankshaft 56 as described later, the control CPU 90 supplies a constant current for generating a counter torque corresponding to the torque TST to interfere with rotation of the drive shaft 22, and accordingly electromagnetically-locks the drive shaft 22 by the assist motor 40. This procedure effectively prevents rotation of the drive shaft 22 even when the clutch motor 30 executes the cranking process.

At step S110, the control CPU 90 sets a torque Tc produced by the clutch motor 30 equal to the starter torque TST. In accordance with a concrete procedure, the control CPU 90 executes a clutch motor control routine illustrated in the flowchart of FIG. 5 to control the clutch motor 30. The clutch motor control routine is executed not only for the control in the starter process but for the control under various driving conditions after an engine start.

Figure 5:
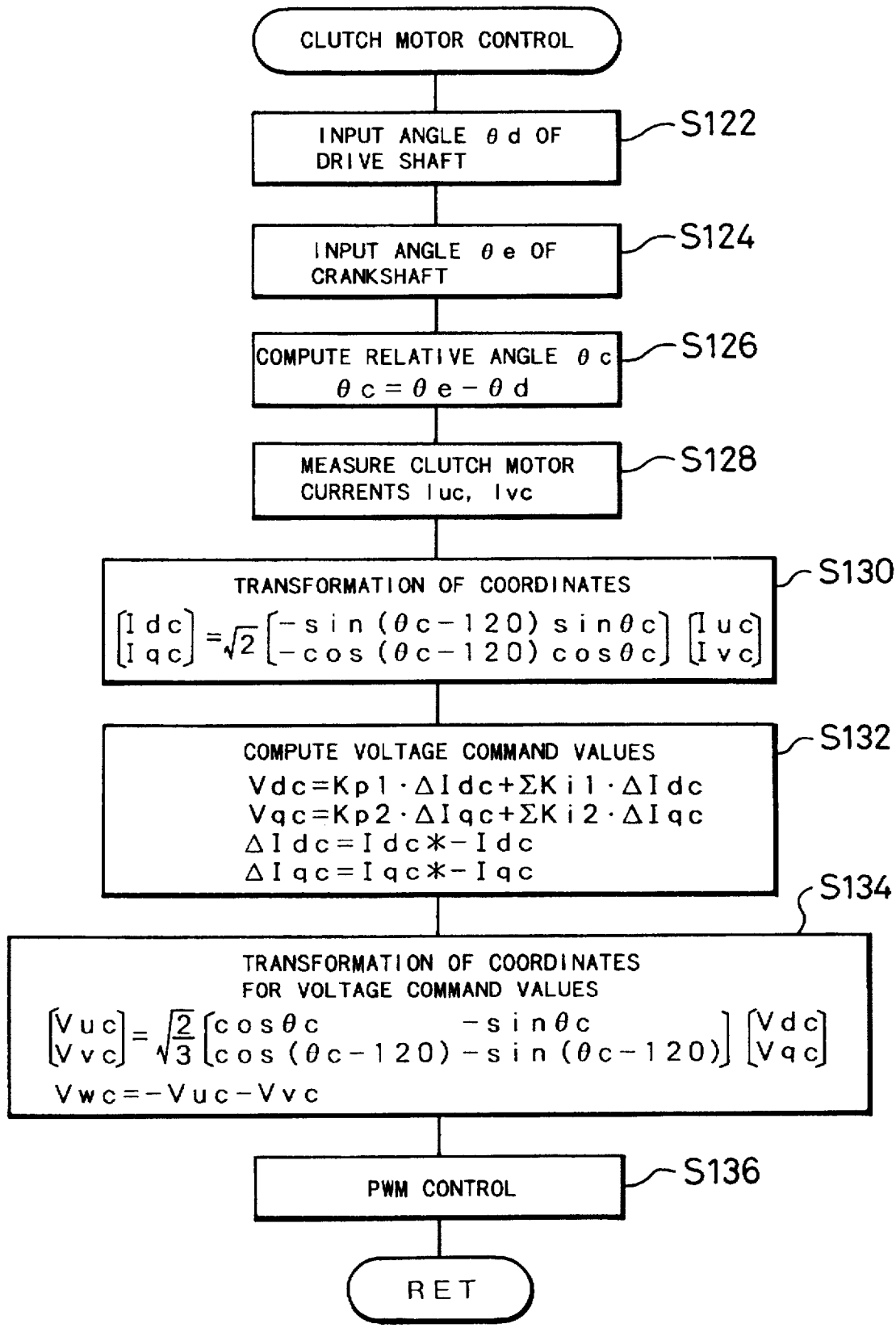
FIG. 5 is a flowchart showing a basic routine of clutch motor control executed by the controller 80.

When the program enters the clutch motor control routine of FIG. 5, the control CPU 90 of the controller 80 first reads a rotational angle θd of the drive shaft 22 from the resolver 48 at step S122 and a rotational angle θe of the crankshaft 56 of the engine 50 from the resolver 39 at step S124. The control CPU 90 then computes a relative angle θc of the drive shaft 22 to the crankshaft 56 by the equation of θc=θe−θd at step S126.

The program proceeds to step S128, at which the control CPU 90 receives inputs of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S130, the control CPU 90 executes transformation of coordinates (three-phase to two-phase transformation) using the values of currents flowing through the three phases obtained at step S128. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases.

After the transformation to the currents of two axes, the control CPU 90 computes deviations of currents Idc and Iqc actually flowing through the d and q axes from current command values Idc* and Iqc* of the respective axes, which are calculated from the torque command value Tc* (=−TST in the starter process) of the clutch motor 30, and determines voltage command values Vdc and Vqc for the d and q axes at step S132. In accordance with a concrete procedure, the control CPU 90 executes operations following Equations (2) and Equations (3) given below:

$$\Delta Idc = Idc^* - Idc$$

$$\Delta Iqc = Iqc^* - Iqc \quad (2)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied.

In the clutch motor control process, a positive value is set to the torque command value Tc* when a torque acting in the direction of normal rotations of the drive shaft 22, that is, in the direction of moving the vehicle forward, is applied to the drive shaft 22. At the time of starter process when a torque acting in the direction of reverse rotations of the drive shaft 22, that is, in the direction of moving the vehicle backward, is applied to the drive shaft 22 and the engine 50 is cranked by the reaction force of the torque, a negative value is set to the torque command value Tc*.

The voltage command value Vdc (Vqc) includes a part in proportion to the deviation ΔI from the current command value I* (first term in right side of Equation (3)) and a summation of historical data of the deviations ΔI for 'i' times (second term in right side).

The control CPU 90 then re-transforms the coordinates of the voltage command values thus obtained (two-phase to three-phase transformation) at step S134. This corresponds to an inverse of the transformation executed at step S130. The inverse transformation determines voltages Vuc, Vvc, and Vwc actually applied to the three-phase coils 36 as given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix} \quad (4)$$

$$Vwc = -Vuc - Vvc$$

The actual voltage control is accomplished by on-off operation of the transistors Tr1 through Tr6 in the first driving circuit 91. At step S136, the on- and off-time of the transistors Tr1 through Tr6 in the first driving circuit 91 is PWM (pulse width modulation) controlled in order to attain the voltage command values Vuc, Vvc, and Vwc determined by Equation (4) above. This clutch motor control process makes the torque mechanically transmitted from the clutch motor 30 to the drive shaft 22 equal to a target torque. At the time of starter process when the torque command value Tc* is negative (−TST) and the assist motor 40 fixes the drive shaft 22 to prevent rotation of the drive shaft 22, a torque TST acting in the direction of normal rotations of the engine 50 is applied to the crankshaft 56 as the reaction force of the torque TST acting in the direction of reverse rotations of the drive shaft 22.

The positional control of the assist motor 40 and the control of the clutch motor 30 rotate the crankshaft 56 of the engine 50 while fixing the drive shaft 22. The clutch motor 30 accordingly functions as a starter motor to effect cranking. The EFIECU 70 controls the fuel injection into the engine 50 and ignition with the igniter 58 concomitantly by the cranking process. Referring back to the starter process routine of FIG. 4, after the positional control of the assist motor 40 and the control of the clutch motor 30, the control CPU 90 reads the revolving speed Ne of the engine 50 at step S112. The input revolving speed Ne is compared with a reference revolving speed NST representing the state of complete explosion at step S114. When the input revolving speed Ne does not exceed the reference revolving speed NST, the program returns to step S106 and repeats the processing at steps S106 through S114.

The cranking process by the clutch motor 30 and the fuel injection and ignition control by the EFIECU 70 lead to a complete explosion in the engine 50, which accordingly increases the revolving speed of the crankshaft 56. When the revolving speed Ne of the engine 50 is determined to be greater than the reference revolving speed NST at step S114, the control CPU 90 terminates the starter control at step S116. The program then goes to END and exits from the routine.

The power transmitting apparatus 20 of the embodiment can start the engine 50 through the starter process described above without any additional starter motor. This structure effectively saves the time and labor as well as the cost required for mounting the additional starter motor and reduces the total weight of the vehicle by the weight of the starter motor.

In the above embodiment, the positional control of the assist motor 40 is carried out to fix the drive shaft 22 and thereby prevent rotation of the drive shaft 22 in the cranking process. There is another applicable method, which activates the assist motor 40 to produce a torque compensating the torque produced by the clutch motor 30 and thereby prevent rotation of the drive shaft 22. Execution of the cranking process in the vehicle stopping on a slope may cause the vehicle to move by the tare weight thereof, which leads to a rotation of the drive shaft 22. In this alternative method, the torque produced by the assist motor 40 should accordingly be the sum of the torque produced by the clutch motor 30 and an additional torque, which the force by the tare weight of the vehicle and the slope is converted to. Another possible method utilizes a fixation member for fixing the drive shaft 22 to the vehicle to prevent the drive shaft 22 from rotating.

Figure 6:
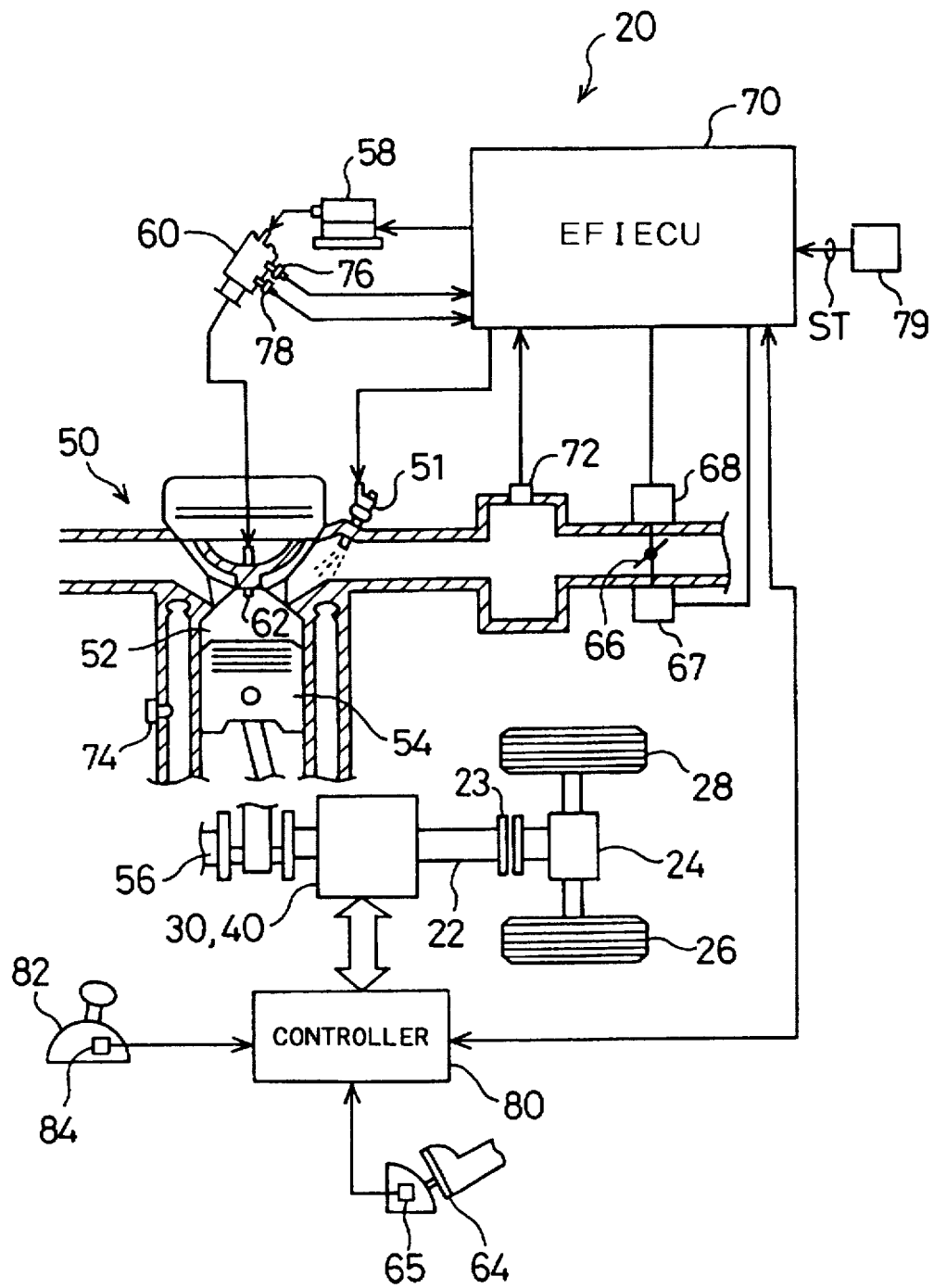
FIG. 6 shows a modification of the first embodiment.

In the structure of the above embodiment, the assist motor 40 is controlled to fix the drive shaft 22 whereas the clutch motor 30 performs the cranking process. In a modified structure shown in FIG. 6 that a clutch 23 is placed between the drive shaft 22 and the driving wheels 26 and 28 to intercept the power transmission from the drive shaft 22 to the driving wheels 26 and 28 at the time of starter control, the assist motor 40 may be driven to rotate and execute the cranking process while the clutch motor 30 is locked up. As long as the torque produced by the assist motor 40 is transmitted to the crankshaft 56, the clutch motor 30 may not be locked up but may cause a slip.

In response to a start of the engine 50, the power transmitting apparatus 20 of the embodiment starts transmitting the energy produced by the engine 50 to the drive shaft 22. The following describes the operation principle of the power transmitting apparatus 20, especially the principle of torque conversion. By way of example, it is assumed that the engine 50 driven by the EFIECU 70 rotates at a revolving speed Ne equal to a predetermined value N1. While the transistors Tr1 through Tr6 in the first driving circuit 91 are in OFF position, the controller 80 does not supply any current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current is flown through the three-phase coils 36 of the clutch motor 30, based on the difference between the revolving speed Ne of the crankshaft 56 of the engine 50 and a revolving speed Nd of the drive shaft 22 (that is, difference Nc (=Ne—Nd) between the revolving speed of the outer rotor 32 and that of the inner rotor 34 in the clutch motor 30). A certain slip accordingly exists between the outer rotor 32 and the inner rotor 34 connected with each other in the clutch motor 30. At this moment, the inner rotor 34 rotates at the revolving speed Nd, which is lower than the revolving speed Ne of the crankshaft 56 of the engine 50. In this state, the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 7:
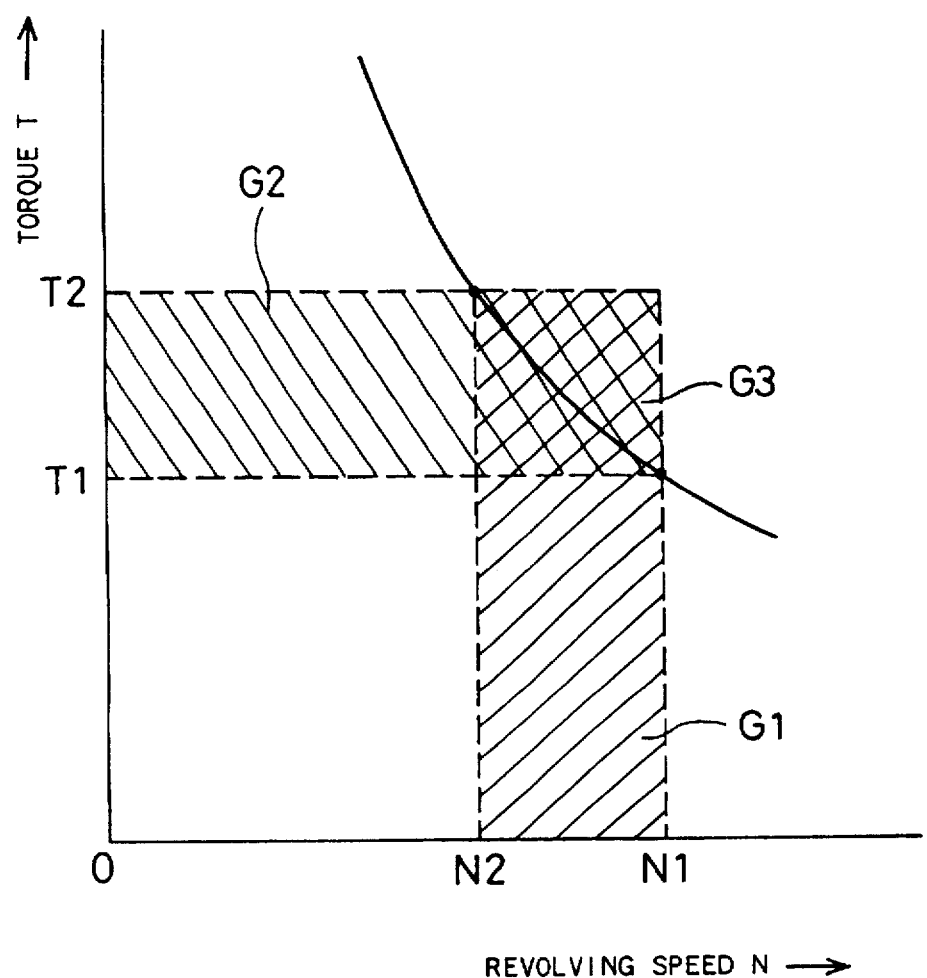
FIG. 7 is a graph illustrating the operation principle of the power transmitting apparatus 20.

Referring to FIG. 7, while the crankshaft 56 of the engine 50 is driven at a revolving speed N1 and a torque T1, energy in a region G1 is regenerated as electric power by the clutch motor 30. The regenerated power is supplied to the assist motor 40 and converted to energy in a region G2, which enables the drive shaft 22 to rotate at a revolving speed N2 and a torque T2. The torque conversion is carried out in the manner discussed above, and the energy corresponding to the slip in the clutch motor 30 or the revolving speed difference Nc (=Ne—Nd) is consequently given as a torque to the drive shaft 22.

In another example, it is assumed that the engine 50 is driven at a revolving speed Ne=N2 and a torque Te=T2, whereas the drive shaft 22 is rotated at the revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne—Nd). While functioning as a normal motor, the clutch motor 30 consumes electric power to apply the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the energy regenerated by the assist motor 40, the control CPU 90 controls both the first driving circuit 91 and the second driving circuit 92. This enables the clutch motor 30 to be driven without using any electric power stored in the battery 94.

Referring back to FIG. 7, when the crankshaft 56 of the engine 50 is driven at the revolving speed N2 and the torque T2, energy in the sum of regions G2 and G3 is regenerated as electric power by the assist motor 40 and supplied to the clutch motor 30. Supply of the regenerated power enables the drive shaft 22 to rotate at the revolving speed N1 and the torque T1.

In the power transmitting apparatus 20 of the first embodiment, the vehicle may be driven only by the assist motor 40 depending upon the charged capacity and state of the battery 94. While the torque Tc of the clutch motor 30 is set equal to zero, the assist motor 40 is activated with the power supplied from the battery 94 to drive the vehicle. The engine 50 may be stopped in this case since the torque Tc of the clutch motor 30 is equal to zero.

Figure 8:
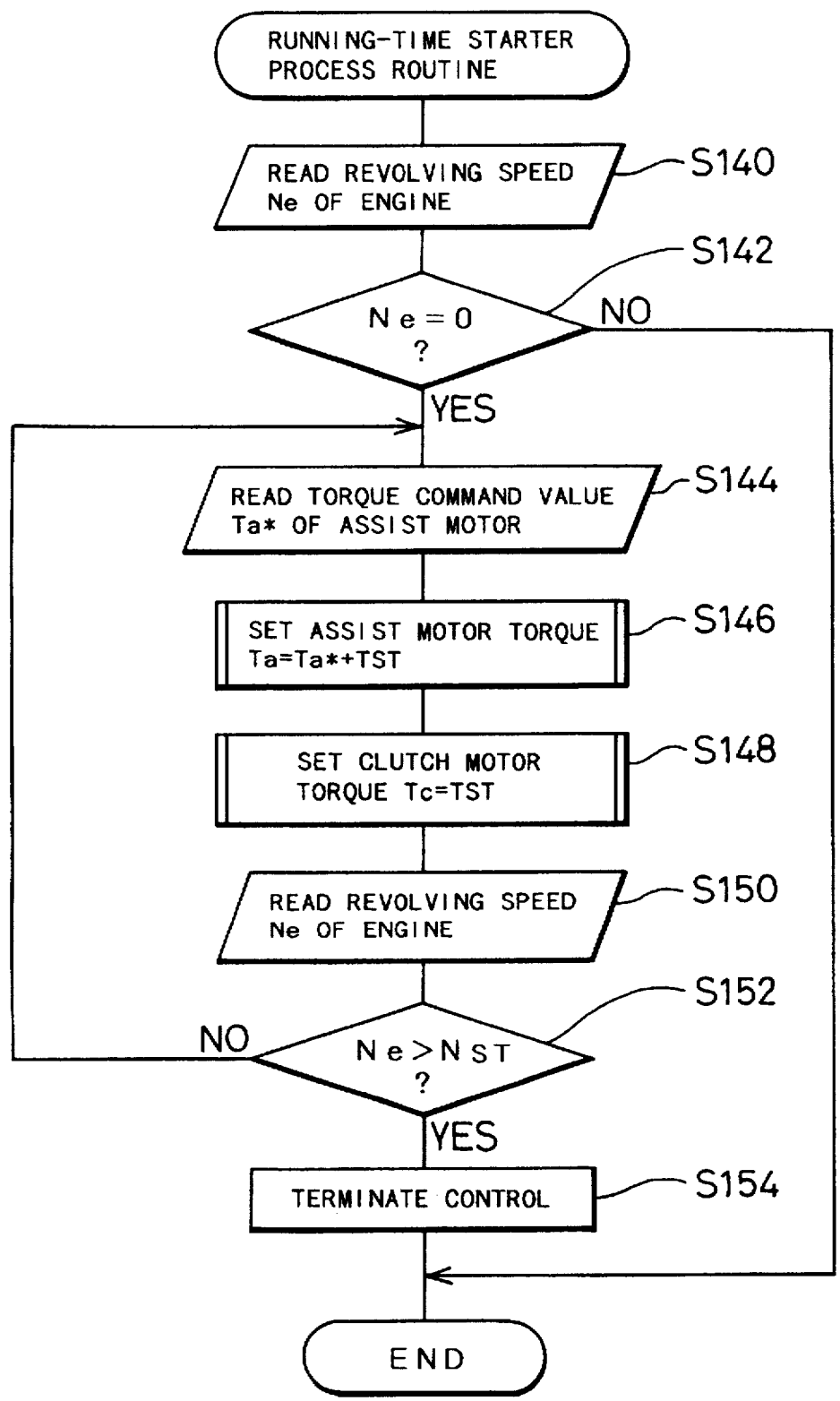
FIG. 8 is a flowchart showing a running-time starter process routine executed by the controller 80.

As an exemplified state, it is assumed that the engine 50 has stopped and the vehicle is driven only by the assist motor 40. When the residual capacity BRM of the battery 94 decreases to be less than a predetermined value or when a driver gives an instruction to switch to the power from the engine 50, the EFIECU 70 receives a signal to start the engine 50 in response to the decrease or instruction. The EFIECU 70 then controls the fuel injection into the engine 50 and ignition with the igniter 58 concurrently with the cranking process by the controller 80, and transmits a starting command of the engine 50 to the controller 80 through communication. The controller 80 receives the transmitted starting command and executes the starter control, based on a running-time starter process routine illustrated in the flowchart of FIG. 8, to effect cranking of the engine 50. The running-time starter process routine of FIG. 8 is executed to start the engine 50 while the vehicle is driven only by the assist motor 40.

When the program enters the running-time starter process routine, the control CPU 90 first receives data of revolving speed Ne of the engine 50 from the resolver 39 at step S140, and determines at subsequent step S142 whether the input revolving speed Ne is equal to zero: When the revolving speed Ne of the engine 50 is not equal to zero at the time point when this routine starts, the program recognizes the non-necessity of the starter control and directly goes to END to exit from the routine.

When the revolving speed Ne of the engine 50 is equal to zero at the time point when this routine starts, on the other hand, the program recognizes the necessity of the starter control and proceeds to step S144 at which the control CPU 90 reads a torque command value Ta* of the assist motor 40. Since the vehicle is driven only by the assist motor 40, the torque command value Ta* coincides with an output torque command value Td*, which is determined as a desired output torque (torque of the drive shaft 22) specified by the driver. The desired output torque specified by the driver is detected as the accelerator pedal position AP (pressing amount of the accelerator pedal 64) measured with the accelerator position sensor 65. The output torque command value Td* corresponding to the measured accelerator pedal position AP is read from a map (not shown), which is previously set and stored in the ROM 90b to represent the relationship between the accelerator pedal position AP and the output torque command value Td*.

Figure 9:
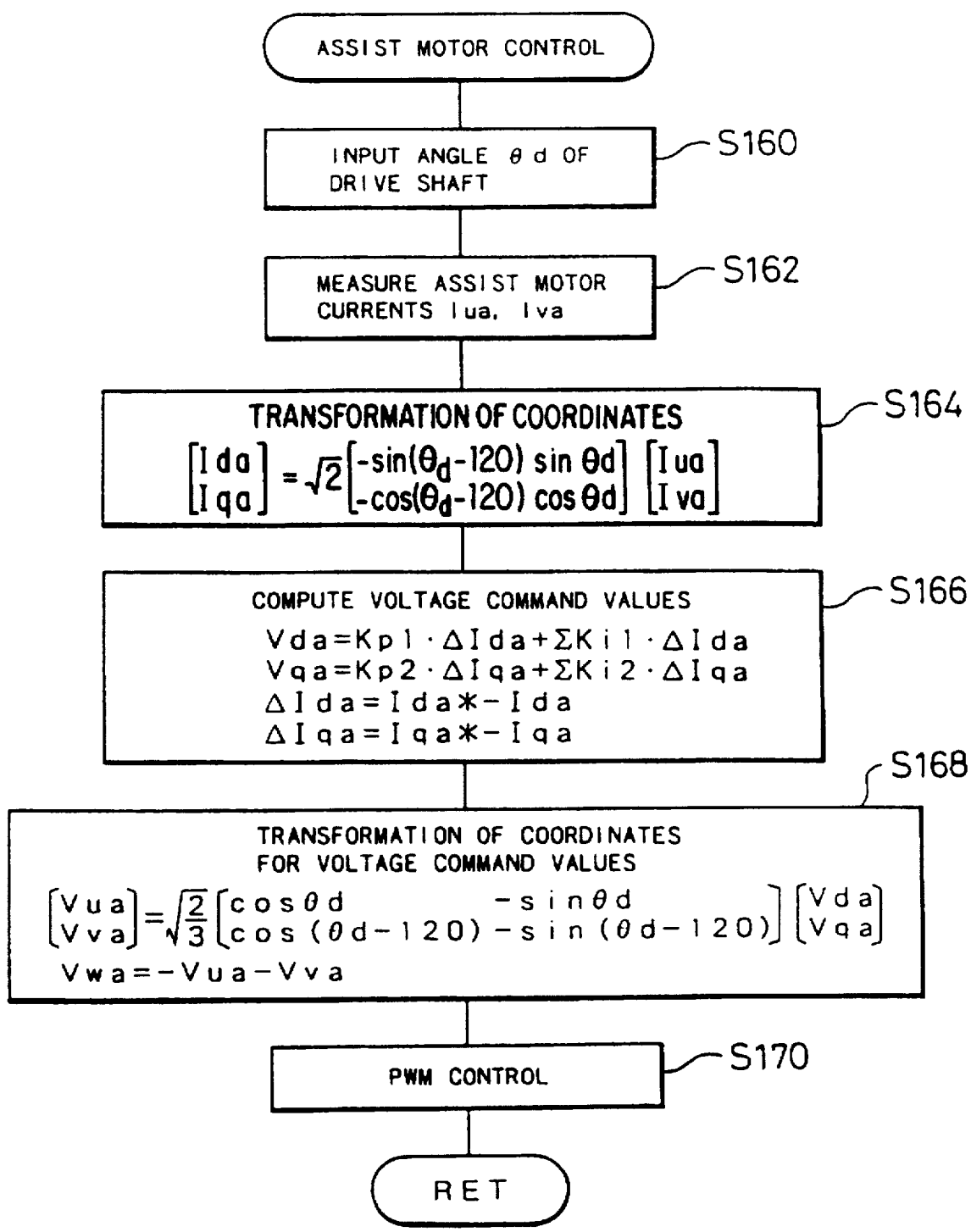
FIG. 9 is a flowchart showing a basic routine of assist motor control executed by the controller 80.

After reading the torque command value Ta* of the assist motor 40 at step S144, the control CPU 90 sets a torque Ta produced by the assist motor 40 equal to the sum of a starter torque TST produced by the clutch motor 30 and the input torque command value Ta* (that is, Ta=Ta*+TST) at step S146. The control CPU 90 then sets a torque Tc produced by the clutch motor Tc equal to the starter torque TST at step S148. Although the control of the clutch motor 30 follows the control of the assist motor 40 in the running-time starter process routine of FIG. 8, the clutch motor 30 and the assist motor 40 are controlled concurrently in the actual procedure. Concomitantly by the cranking process at the torque TST by the clutch motor 30, the torque Ta of the assist motor 40 is set equal to the sum of the torque command value Ta* computed from the accelerator pedal position AP and the starter torque TST produced by the clutch motor 30. The torque acting on the drive shaft 22 thus does not change before and after the cranking process. The control of the clutch motor 30 follows the clutch motor control routine shown in the flowchart of FIG. 5 and is thus not described here. The control of the assist motor 40 follows an assist motor control routine illustrated in the flowchart of FIG. 9.

When the program enters the assist motor control routine, the control CPU 90 of the controller 80 first reads a rotational angle θd of the drive shaft 22 from the resolver 48 at step S160, and receives data of assist motor currents Iua and Iva flowing through the U phase and V phase of the three-phase coils 44 in the assist motor 40, from the ammeters 97 and 98 at step S162. As described previously, the current flowing through the W phase is calculated from the data of currents through the U phase and V phase since the sum of the currents is equal to zero. The control CPU 90 then executes transformation of coordinates for the currents of the three phases at step S164, computes voltage command values Vda and Vqa at step S166, and executes inverse transformation of coordinates for the voltage command values at step S168. At subsequent step S170, the control CPU 90 determines the on and off time of the transistors Tr11 through Tr16 in the second driving circuit 92 of the assist motor 40 for PWM (pulse width modulation) control. Detailed description is omitted since the processing executed at steps S164 through S170 is similar to that executed at steps S130 through S136 of the clutch motor control routine shown in the flowchart of FIG. 5.

The control of the assist motor 40 and the clutch motor 30 allows the crankshaft 56 of the engine 50 to rotate without a variation in torque acting on the drive shaft 22. The EFIECU 70 controls the fuel injection and ignition concomitantly by the cranking process. Referring back to the running-time starter process routine of FIG. 8, after the control of the assist motor 40 and the clutch motor 30, the control CPU 90 reads the revolving speed Ne of the engine 50 at step S150. The input revolving speed Ne is compared with the reference revolving speed NST representing the state of complete explosion at step S152. When the input revolving speed Ne does not exceed the reference revolving speed NST, the program returns to step S144 and repeats the processing at steps S144 through S152.

The cranking process by the clutch motor 30 and the fuel injection and ignition control by the EFIECU 70 lead to a complete explosion in the engine 50, which accordingly increases the revolving speed of the crankshaft 56. When the revolving speed Ne of the engine 50 is determined to be greater than the reference revolving speed NST at step S152, the control CPU 90 terminates the starter control under the running condition at step S154. The program then goes to END and exits from the routine.

Figure 10:
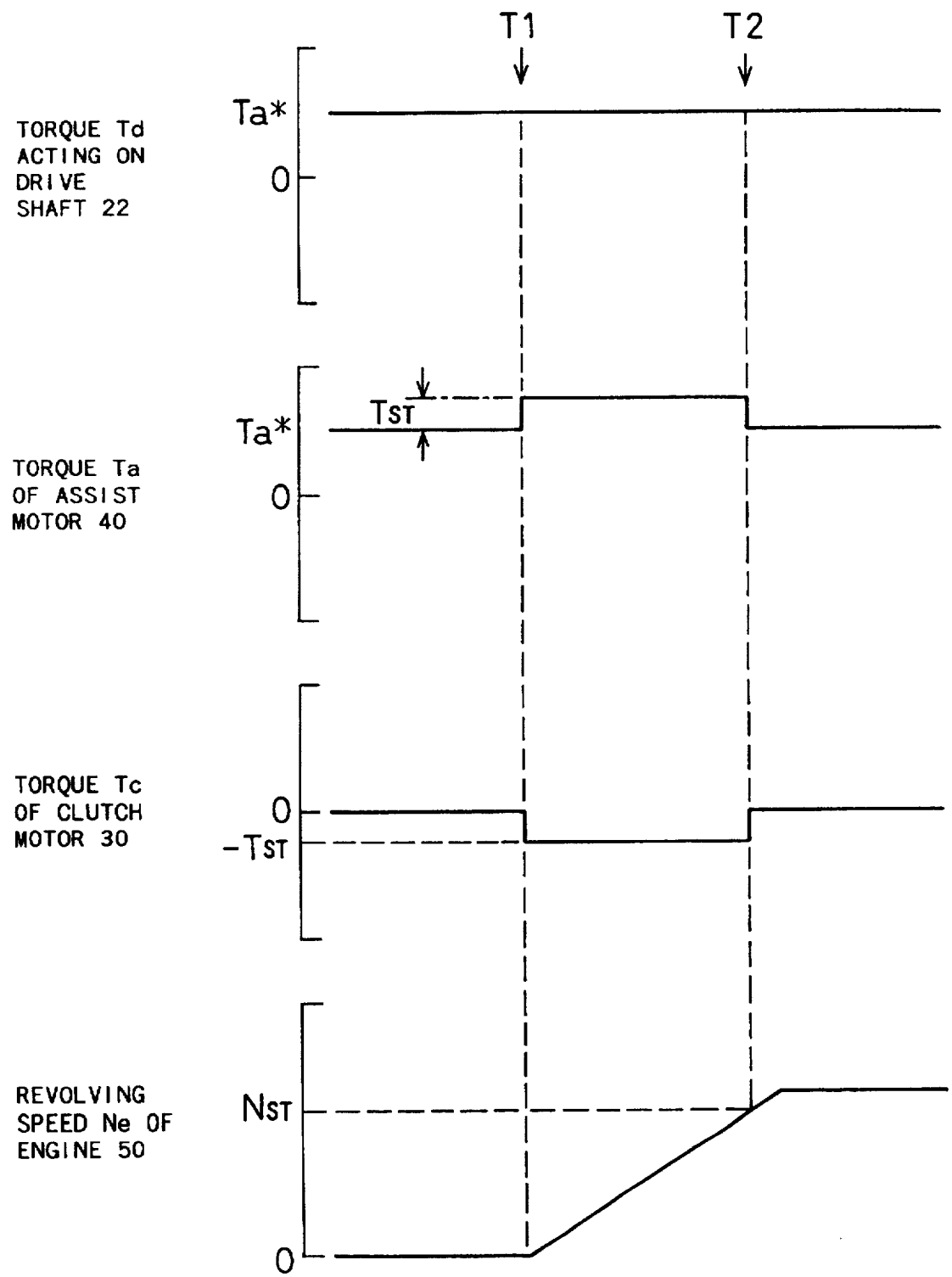
FIG. 10 shows variations in torque Td acting on the drive shaft 22, torque Ta of the assist motor 40, torque Tc of the clutch motor 30, and revolving speed Ne of the engine 50 during the cranking process.

FIG. 10 shows variations in torque Td acting on the drive shaft 22, torque Ta of the assist motor 40, torque Tc of the clutch motor 30, and revolving speed Ne of the engine 50 during the cranking process. At a time point T1, in response to a signal input to start the engine 50, the cranking process starts and sets the torque Ta of the assist motor 40 equal to (Ta*+TST) and the torque Tc of the clutch motor 30 equal to the negative starter torque −TST. As previously described, the torque Tc has a positive value when the torque acts in the direction of normal rotations of the drive shaft 22. In the cranking process, the torque Tc of the clutch motor 30 is set equal to the negative starter torque −TST to make the applied torque act in the direction of normal rotations of the engine 50, that is, in the direction of reverse rotations of the drive shaft 22 as the reaction force.

As the clutch motor 30 applies the torque TST to the crankshaft 56, the revolving speed Ne of the engine 50 increases to a state of full explosion at a time point T2, when the control of the assist motor 40 and the clutch motor 30 is concluded. The fuel injection and ignition control by the EFIECU 70 and the positional control of the throttle valve 66 allow the engine 50 to rotate at the idling speed. The torque Td acting on the drive shaft 22 is equal to the sum of the torque Ta of the assist motor 40 and the torque Tc of the clutch motor 30 (Td=Ta+Tc) and thus does not change before, during, and after the cranking process including the time points T1 and T2.

For the clarity of explanation, the graph of FIG. 10 shows the variations of the torques Td, Ta, and Tc and the revolving speed Ne on the assumption that the driver does not change the desired torque Td* during the cranking process. Even when the driver varies the desired torque Td* in the course of cranking, however, the torque Ta transmitted from the assist motor 40 to the drive shaft 22 becomes equal to the sum of the starter torque TST and the torque Ta* varying with the variation in desired torque Td*. This allows the desired torque Td* specified by the driver to directly act on the drive shaft 22.

After the engine 50 falls in the state of full explosion and the starter process under the running condition is concluded, the power transmitting apparatus 20 works according to the operation principle described above and starts transmitting the energy produced by the engine 50 to the drive shaft 22.

The power transmitting apparatus 20 of the first embodiment can start the engine 50 under the running condition through the running-time starter process described above without any additional starter motor. The starter torque TST required for cranking and produced by the clutch motor 30 is added to the torque of the assist motor 40. This structure effectively prevents the torque acting on the drive shaft 22 from being varied concomitantly by cranking of the drive shaft 22, thereby realizing a good ride.

In the power transmitting apparatus 20 of the embodiment, the assist motor 40 is driven to produce a torque, which is the sum of the starter torque TST produced by the clutch motor 30 and the torque required for the drive shaft 22. In a modified system allowing some variation in torque acting on the drive shaft 22 accompanied by cranking of the drive shaft 22, however, the additional torque added to the torque required for the drive shaft 22 may be a little different from the starter torque TST.

The flowchart of FIG. 8 shows the process of starting the engine 50 while the vehicle is driven and run by the assist motor 40. This routine is also applicable to start the engine 50 while the vehicle stops. In such a case, the torque command value Ta* of the assist motor 40 is equal to zero, and the torque Ta of the assist motor 40 is thus equal to the starter torque TST. This is equivalent to the starter process routine illustrated in the flowchart of FIG. 4.

In the structure of the power transmitting apparatus 20 shown in FIG. 1, the clutch motor 30 and the assist motor 40 are separately attached to the different positions of the drive shaft 22. Like a modified power transmitting apparatus 20A illustrated in FIG. 10, however, the clutch motor and the assist motor may integrally be joined with each other. A clutch motor 30A of the power transmitting apparatus 20A includes an inner rotor 34A connecting with the crankshaft 56 and an outer rotor 32A linked with the drive shaft 22. Three-phase coils 36A are attached to the inner rotor 34A, and permanent magnets 35A are set on the outer rotor 32A in such a manner that the outer surface and the inner surface thereof have different magnetic poles. An assist motor 40A includes the outer rotor 32A of the clutch motor 30A and a stator 43 with three-phase coils 44 mounted thereon. In this structure, the outer rotor 32A of the clutch motor 30A also works as a rotor of the assist motor 40A. Since the three-phase coils 36A are mounted on the inner rotor 34A connecting with the crankshaft 56, a rotary transformer 38A for supplying electric power to the three-phase coils 36A of the clutch motor 30A is attached to the crankshaft 56.

In the power transmitting apparatus 20A, the voltage applied to the three-phase coils 36A on the inner rotor 34A is controlled against the inner-surface magnetic pole of the permanent magnets 35A set on the outer rotor 32A. This allows the clutch motor 30A to work in the same manner as the clutch motor 30 of the power transmitting apparatus 20 shown in FIG. 1. The voltage applied to the three-phase coils 44 on the stator 43 is controlled against the outer-surface magnetic pole of the permanent magnets 35A set on the outer rotor 32A. This allows the assist motor 40A to work in the same manner as the assist motor 40 of the power transmitting apparatus 20. The modified power transmitting apparatus 20A has the structure equivalent to that of the power transmitting apparatus 20, and the starter process shown in FIG. 4 and the running-time starter process shown in FIG. 8 are thus applicable to the power transmitting apparatus 20A as well.

As discussed above, the outer rotor 32A functions concurrently as one of the rotors in the clutch motor 30A and as the rotor of the assist motor 40A, thereby effectively reducing the size and weight of the whole power transmitting apparatus 20A.

Figure 12:
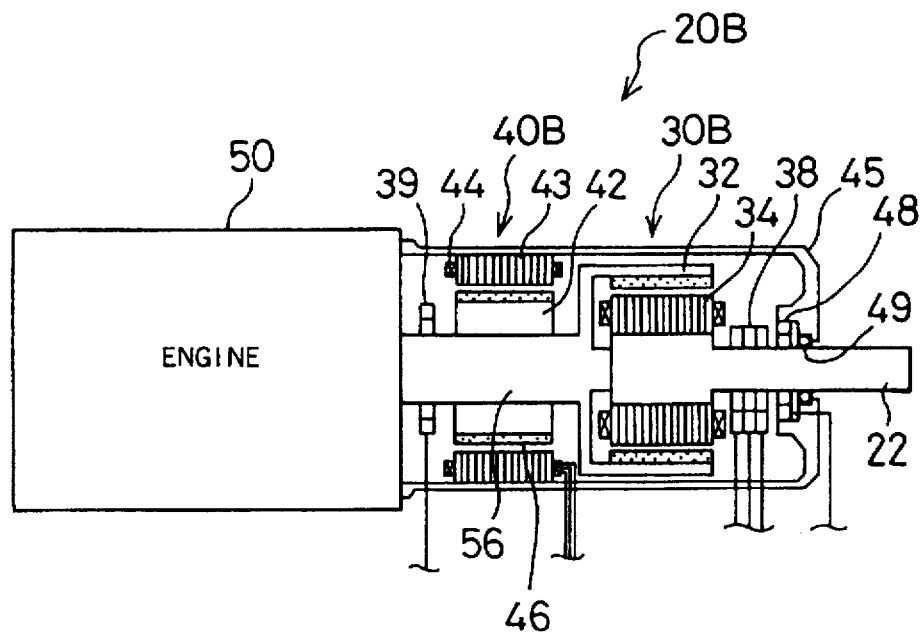
FIG. 12 schematically illustrates structure of another power transmitting apparatus 20B as a second embodiment according to the present invention.

FIG. 12 schematically illustrates structure of another power transmitting apparatus 20B as a second embodiment according to the present invention. The power transmitting apparatus 20B of the second embodiment has a similar structure to that of the power transmitting apparatus 20 of the first embodiment, except that an assist motor 40B is attached to the crankshaft 56 placed between the engine 50 and a clutch motor 30B. In the power transmitting apparatus 20B of the second embodiment, like elements as those of the power transmitting apparatus 20 of the first embodiment are shown by like numerals or symbols and are not described here. The symbols used in the description of the first embodiment have like meanings unless otherwise specified.

Figure 13:
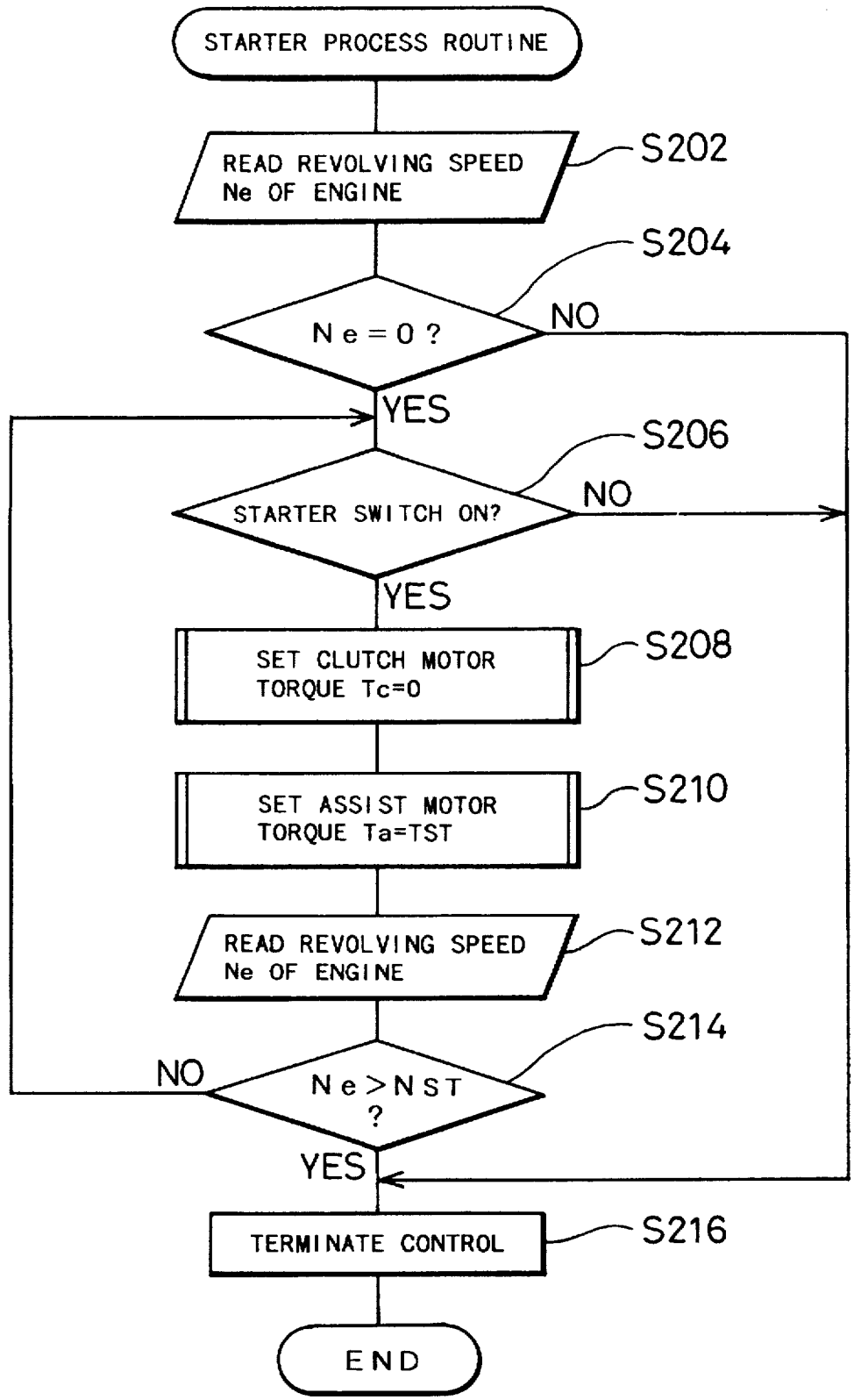
FIG. 13 is a flowchart showing a starter process routine executed by the controller 80 of the power transmitting apparatus 20B in the second embodiment.

The power transmitting apparatus 20B thus constructed functions in the manner described below. When a driver operates the starter switch 79 under the non-driving condition of the engine 50 to start the vehicle, the EFIECU 70 perceives the operation of the starter switch 79, controls the fuel injection into the engine 50 and ignition with the igniter 58 in combination with the cranking process by the controller 80, and sends a starting command to the controller 80 through communication. This procedure is similar to that executed in the power transmitting apparatus 20 of the first embodiment. The control CPU 90 of the controller 80 receives the starting command and executes the starter control based on a starter process routine illustrated in the flowchart of FIG. 13.

When the program enters the starter process routine, the control CPU 90 first receives data of revolving speed Ne of the engine 50 from the resolver 39 at step S202 and determines whether the input revolving speed Ne is equal to zero at step S204. When the revolving speed Ne of the engine 50 is not equal to zero, the program recognizes the non-necessity of the starter control and proceeds to step S216, at which the control CPU 90 stops the control procedure and exits from the routine. When the revolving speed Ne of the engine 50 is equal to zero, on the other hand,. the control CPU 90 reconfirms the ON-position of the starter switch 79 through the communication with the EFIECU 70 at step S206.

After reconfirming the ON-position of the starter switch 79, the control CPU 90 sets the torque Tc produced by the clutch motor 30B equal to zero at step S208 and sets the torque Ta produced by the assist motor 40B equal to the starter torque TST at step S210. In accordance with a concrete procedure, the control CPU 90 turns off the transistors Tr1 through Tr6 of the first driving circuit 91 to cut the electromagnetic coupling of the outer rotor 32 with the inner rotor 34 of the clutch motor 30B. The control CPU 90 concurrently sets the torque command value Ta* of the assist motor 40B equal to TST and controls the assist motor 40B according to the assist motor control routine illustrated in the flowchart of FIG. 9.

The control of the clutch motor 30B and the assist motor 40B enables the assist motor 40B to work as the starter motor and rotates the crankshaft 56 of the engine 50 to effect cranking. The EFIECU 70 controls the fuel injection into the engine 50 and ignition with the igniter 58 concomitantly by the cranking process. In the starter process routine of FIG. 13, after the control of the clutch motor 30B and the assist motor 40B, the control CPU 90 reads the revolving speed Ne of the engine 50 at step S212. The input revolving speed Ne is compared with a reference revolving speed NST representing the state of complete explosion at step S214. When the input revolving speed Ne exceeds the reference revolving speed NST, the control CPU 90 perceives the state of complete explosion and stops the starter control at step S216. The program then goes to END and exits from the routine. The program returns to step S206 and repeats the processing at steps S206 through S214 until the input revolving speed Ne becomes greater than the reference revolving speed NST.

The power transmitting apparatus 20B of the second embodiment can start the engine 50 through the starter process described above without any additional starter motor. This structure effectively saves the time and labor as well as the cost required for mounting the additional starter motor and reduces the total weight of the vehicle by the weight of the starter motor.

Figure 14:
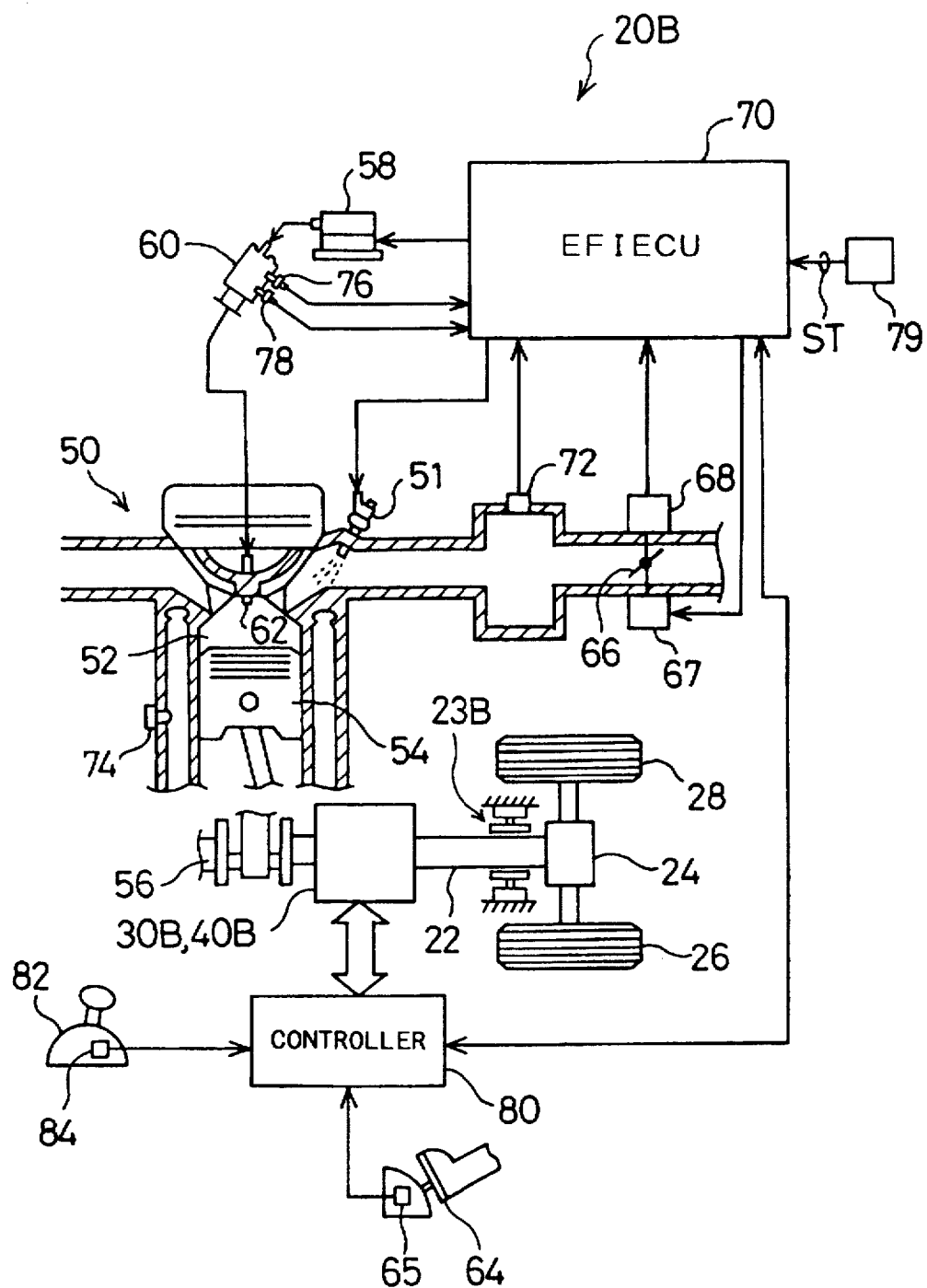
FIG. 14 shows a modification of the second embodiment.

In the power transmitting apparatus 20B of the second embodiment, the assist motor 40B is driven to effect cranking while the torque Tc of the clutch motor 30B is set equal to zero. In a modified structure illustrated in FIG. 14, a lock mechanism 23B for locking the rotation of the drive shaft 22 is mounted on the drive shaft 22. While the lock mechanism 23B fixes the drive shaft 22 to interfere with its rotation, the clutch motor 30B is driven to crank the crankshaft 56. In this structure, the clutch motor 30B is controlled according to the clutch motor control routine of FIG. 5 with the torque command value Tc* of the clutch motor 30B set equal to the negative starter torque −TST.

In response to a start of the engine 50, the power transmitting apparatus 20B starts transmitting the energy produced by the engine 50 to the drive shaft 22. The following describes the operation principle of the power transmitting apparatus 20B of the second embodiment. By way of example, it is assumed that the engine 50 is driven with a torque Te and at a revolving speed Ne. When a torque Ta is added to the crankshaft 56 by the assist motor 40B linked with the crankshaft 56, the sum of the torques (Te+Ta) consequently acts on the crankshaft 56. When the clutch motor 30B is controlled to produce the torque Tc equal to the sum of the torques (Te+Ta), the torque Tc (=Te+Ta) is transmitted to the drive shaft 22.

When the revolving speed Ne of the engine 50 is greater than the revolving speed Nd of the drive shaft 22, the clutch motor 30B regenerates electric power based on the revolving speed difference Nc between the revolving speed Ne of the engine 50 and the revolving speed Nd of the drive shaft 22. The regenerated power is supplied to the assist motor 40B via the power lines P1 and P2 and the second driving circuit 92 to activate the assist motor 40B. Provided that the torque Ta of the assist motor 40B is substantially equivalent to the electric power regenerated by the clutch motor 30B, free torque conversion is allowed for the energy output from the engine 50 within a range holding the relationship of Equation (5) given below. Since the relationship of Equation (5) represents the ideal state with an efficiency of 100%, (Tc× Nd) is a little smaller than (Te×Ne) in the actual state.

$$Te \times Ne = Tc \times Nd \qquad (5)$$

Referring to FIG. 7, under the condition that the crankshaft 56 rotates with the torque T1 and at the revolving speed N1, the energy corresponding to the sum of the regions G1+G3 is regenerated by the clutch motor 30B and supplied to the assist motor 40B. The assist motor 40B converts the received energy in the sum of the regions G1+G3 to the energy corresponding to the sum of the regions G2+G3 and transmits the converted energy to the crankshaft 56.

When the revolving speed Ne of the engine 50 is smaller than the revolving speed Nd of the drive shaft 22, the clutch motor 30B works as a normal motor. In the clutch motor 30B, the inner rotor 34 rotates relative to the outer rotor 32 in the direction of rotation of the drive shaft 22 at a revolving speed defined by the absolute value of the revolving speed difference Nc (=Ne—Nd). Provided that the torque Ta of the assist motor 40B is set to a negative value, which enables the assist motor 40B to regenerate electric power substantially equivalent to the electrical energy consumed by the clutch motor 30B, free torque conversion is also allowed for the energy output from the engine 50 within the range holding the relationship of Equation (5) given above.

Referring to FIG. 7, under the condition that the crankshaft 56 rotates with the torque T2 and at the revolving speed N2, the energy corresponding to the region G2 is regenerated by the assist motor 40B and consumed by the clutch motor 30B as the energy corresponding to the region G1.

In the power transmitting apparatus 20B of the second embodiment, the vehicle may be driven only by the clutch motor 30B depending upon the charged capacity and state of the battery 94. In this case, the clutch motor 30B is activated with the power from the battery 94 to drive the vehicle. In order to make the torque Tc of the clutch motor 30B act on the drive shaft 22, it is required to support the reaction torque by the crankshaft 56. The power transmitting apparatus 20B of the second embodiment stops the engine 50 and makes a constant current flow through the three-phase coils 44 of the assist motor 40B to lock up the assist motor 40B. This results in fixing the cranks shaft 56 and supporting the reaction force of the torque Tc applied from the clutch motor 30B to the drive shaft 22.

Figure 15:
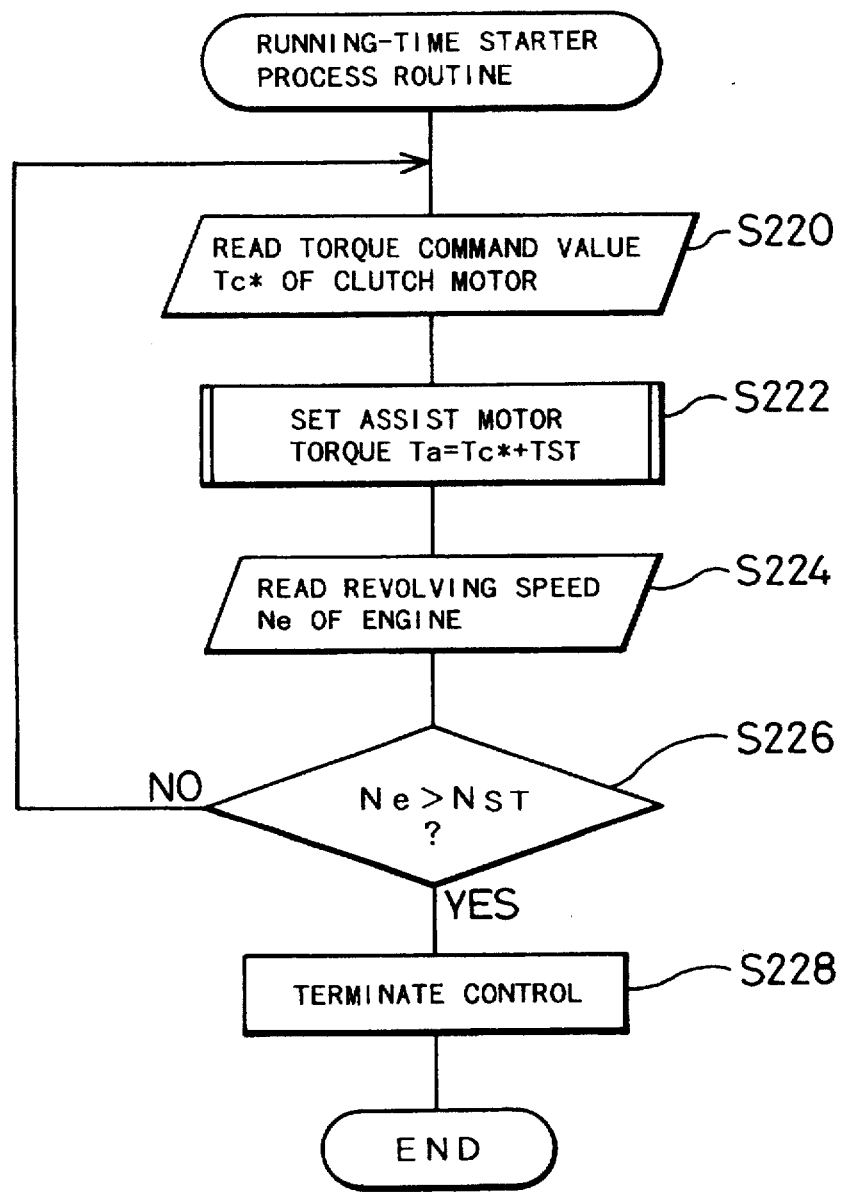
FIG. 15 is a flowchart showing a running-time starter process routine executed by the controller 80 of the power transmitting apparatus 20B in the second embodiment.

As an exemplified state, it is assumed that the vehicle is driven only by the clutch motor 30B while the engine 50 stops and the assist motor 40B locks up the crankshaft 56. When the residual capacity BRM of the battery 94 decreases to be less than a predetermined value or when a driver gives an instruction to switch to the power from the engine 50, the EFIECU 70 receives a signal to start the engine 50 in response to the decrease or instruction. The EFIECU 70 then controls the fuel injection into the engine 50 and ignition with the igniter 58 concurrently with the cranking process by the controller 80, and transmits a starting command of the engine 50 to the controller 80 through communication. The controller 80 receives the transmitted starting command and executes the starter control, based on a running-time starter process routine illustrated in the flowchart of FIG. 15, to effect cranking of the engine 50. The running-time starter process routine of FIG. 15 is executed to start the engine 50 while the vehicle is driven only by the clutch motor 30B.

When the program enters the running-time starter process routine of the second embodiment, the control CPU 90 first reads the torque command value Tc* of the clutch motor 30B at step S220. The torque command value Tc* of the clutch motor 30B coincides with an output torque command value Td*, which is determined as a desired output torque (torque of the drive shaft 22) specified by the driver. The control CPU 90 then sets the torque Ta of the assist motor 40B equal to the sum of the starter torque TST and the input torque command value Tc* of the clutch motor 30B (that is, Ta=Tc*+TST) at step S222. The operation of adding the starter torque TST to the torque command value Tc* of the clutch motor 30B to set the torque Ta of the assist motor 40B is ascribed to the fact that the assist motor 40B supports the torque generated as the reaction force of the torque Tc applied from the clutch motor 30B to the drive shaft 22 while the engine 50 stops. The assist motor 40B is controlled according to the assist motor control routine of FIG. 8 with the torque command value Ta* of the assist motor 40B, which is set equal to the sum of the torque command value Tc* of the clutch motor 30B and the starter torque TST, that is, equal to the torque Ta of the assist motor 40B.

The control of the assist motor 40B allows the crankshaft 56 of the engine 50 to rotate without a variation in torque acting on the drive shaft 22. The EFIECU 70 controls the fuel injection and ignition concomitantly by the cranking process. After the control of the assist motor 40B, the control CPU 90 reads the revolving speed Ne of the engine 50 at step S224. The input revolving speed Ne is compared with the reference revolving speed NST representing the state of complete explosion at step S226. When the input revolving speed Ne exceeds the reference revolving speed NST, the control CPU 90 perceives the state of complete explosion and stops the starter control under the running condition at step S228. The program then goes to END and exits from the routine. The program returns to step S220 and repeats the processing at steps S220 through S226 until the revolving speed Ne of the engine 50 becomes greater than the reference revolving speed NST representing the state of complete explosion.

After the engine 50 falls in the state of full explosion and the starter process under the running condition is concluded, the power transmitting apparatus 20B works according to the operation principle described above and starts transmitting the energy produced by the engine 50 to the drive shaft 22.

The power transmitting apparatus 20B of the second embodiment can start the engine 50 under the running condition through the running-time starter process described above without any additional starter motor. The torque acting on the drive shaft 22 is applied only from the clutch motor 30B, so that the cranking process does not change the torque of the drive shaft 22.

The flowchart of FIG. 15 shows the process of starting the engine 50 while the vehicle is driven and run by the clutch motor 30B. This routine is also applicable to start the engine 50 while the vehicle stops. In such a case, the torque command value Tc* of the clutch motor 30B is equal to zero, and the torque Ta of the assist motor 40B is thus equal to the starter torque TST. This is equivalent to the starter process routine illustrated in the flowchart of FIG. 13.

Figure 16:
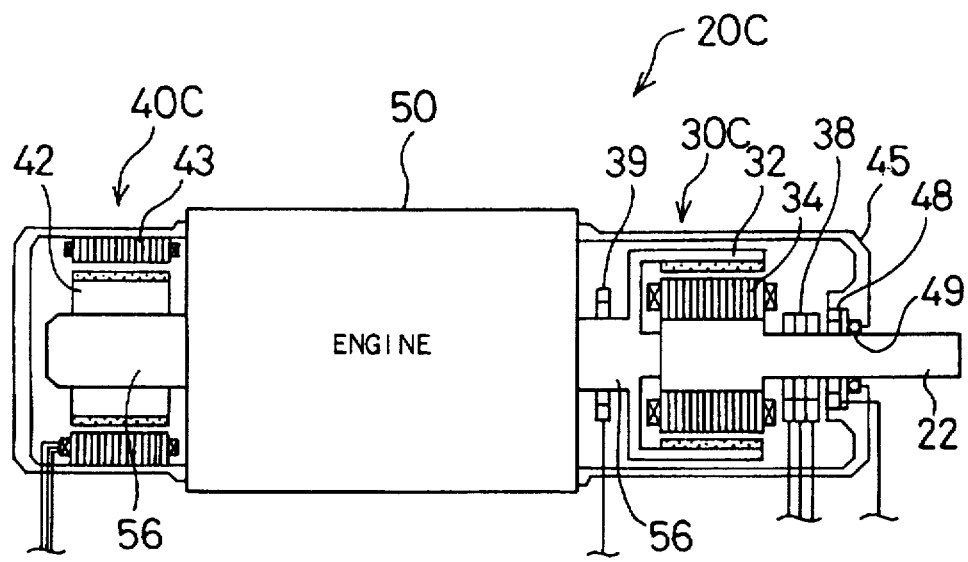
FIG. 16 schematically illustrates a power transmitting apparatus 20C as a modification of the second embodiment.

In the power transmitting apparatus 20B of FIG. 12 given as the second embodiment discussed above, the assist motor 40B is attached to the crankshaft 56 placed between the engine 50 and the clutch motor 30B. Like another power transmitting apparatus 20C illustrated in FIG. 16, however, the engine 50 may be interposed between the clutch motor 30C and the assist motor 40C, both of which are linked with the crankshaft 56.

In the power transmitting apparatus 20B of FIG. 12, the clutch motor 30B and the assist motor 40B are separately attached to the different positions of the crankshaft 56. Like a power transmitting apparatus 20D shown in FIG. 17, however, the clutch motor and the assist motor may integrally be joined with each other. A clutch motor 30D of the power transmitting apparatus 20D includes an outer rotor 32D connecting with the crankshaft 56 and an inner rotor 34 linked with the drive shaft 22. Three-phase coils 36 are attached to the inner rotor 34, and permanent magnets 35D are set on the outer rotor 32D in such a manner that the outer surface and the inner surface thereof have different magnetic poles. An assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D.

In the power transmitting apparatus 20D, the voltage applied to the three-phase coils 36 on the inner rotor 34 is controlled against the inner-surface magnetic pole of the permanent magnets 35D set on the outer rotor 32D. This allows the clutch motor 30D to work in the same manner as the clutch motor 30B of the power transmitting apparatus 20B shown in FIG. 12. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40B of the power transmitting apparatus 20B. The modified power transmitting apparatus 20D has the structure equivalent to that of the power transmitting apparatus 20B of the second embodiment, and the starter process shown in FIG. 13 and the running-time starter process shown in FIG. 15 are thus applicable to the power transmitting apparatus 20D as well.

Figure 11:
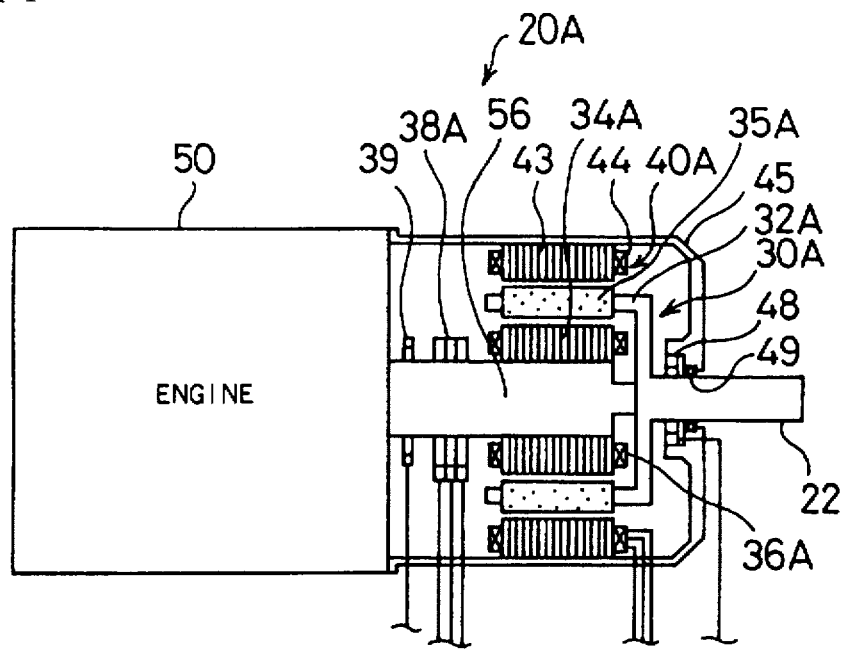
FIG. 11 schematically illustrates a power transmitting apparatus 20A as a modification of the first embodiment.
Figure 17:
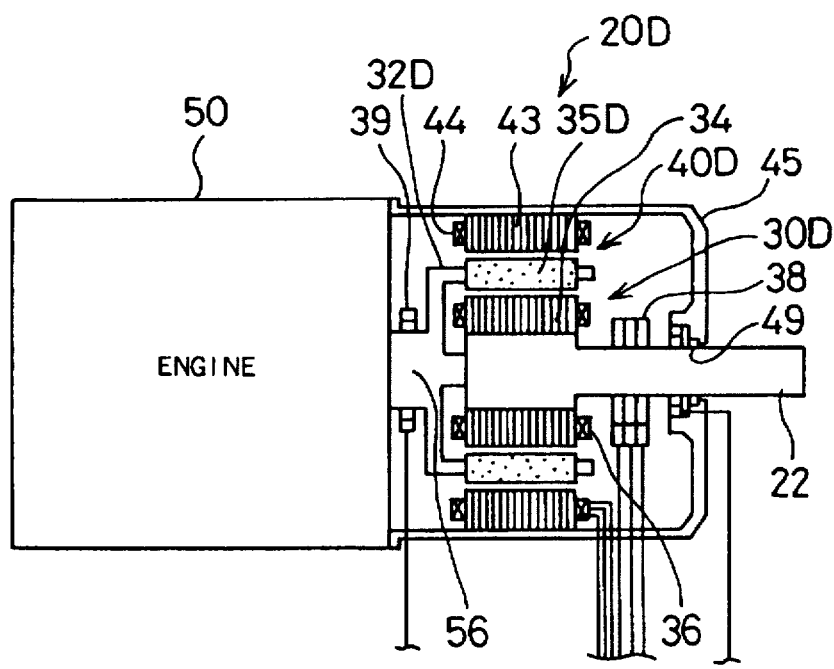
FIG. 17 schematically illustrates a power transmitting apparatus 20D as another modification of the second embodiment.

Like the power transmitting apparatus 20A shown in FIG. 11, in the power transmitting apparatus 20D of FIG. 17, the outer rotor 32D functions concurrently as one of the rotors in the clutch motor 30D and as the rotor of the assist motor 40D, thereby effectively reducing the size and weight of the whole power transmitting apparatus 20D.

There may be many other modifications, alternations, and changes without departing from the scope or spirit of essential characteristics of the invention. It is thus clearly understood that the above embodiments are only illustrative and not restrictive in any sense.

Figure 18:
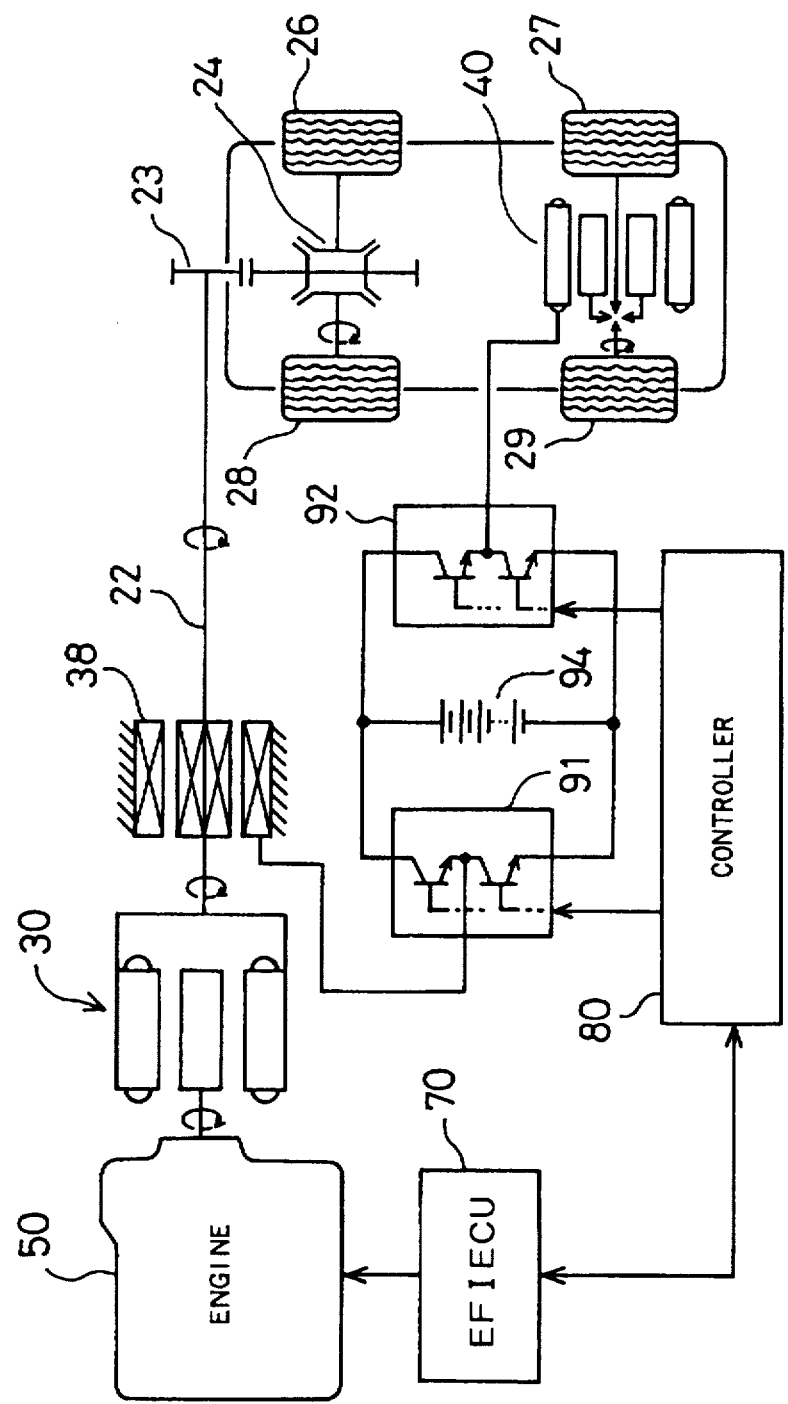
FIG. 18 shows structure in which the power transmitting apparatus 20 of the first embodiment shown in FIG. 2 is applied to a vehicle with a four-wheel drive.

For example, the power transmitting apparatus 20 of FIG. 2 is applicable to the vehicle with a four-wheel drive (4 WD) as shown in FIG. 18. In the structure of FIG. 18, the assist motor 40, which is mechanically linked with the drive shaft 22 in the structure of FIG. 2, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28.

Part of the control procedures described above is applicable to the power transmitting apparatus 20 installed in the vehicle with a four-wheel drive. For example, in the starter process to start the engine 50, the drive shaft 22 is fixed by means of a fixation member, and the clutch motor 30 is controlled with the torque Tc set equal to the starter torque TST. A clutch mounted on the drive shaft 22 enables the assist motor 40 to drive the vehicle even when the engine 50 stops. In the running-time starter process to start the engine 50 when the vehicle is driven by the assist motor 40, the drive shaft 22 is fixed by means of a fixation member which is disposed between the clutch and the clutch motor 30, and the clutch motor 30 is controlled with the torque Tc set equal to the starter torque TST.

The gasoline engine driven by means of gasoline is used as the engine 50 in the above power transmitting apparatuses. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the power transmitting apparatuses described above. Other motors such as variable reluctance (VR)-type synchronous motors, vernier motors, d.c. motors, induction motors, superconducting motors, and stepping motors may be used for the regenerative operation and the power operation.

The rotary transformer 38 used as means for transmitting electric power to the clutch motor 30 may be replaced by a slip ring-brush contact, a slip ring-mercury contact, a semiconductor coupling of magnetic energy, or the like.

In the above power transmitting apparatuses, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94.

Although the power transmitting apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power transmitting apparatus for starting an engine and transmitting power output from said engine to a drive shaft, said power transmitting apparatus comprising:

a clutch motor comprising a first rotor connected with an output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors;

a clutch motor-driving circuit for controlling a degree of the electromagnetic connection of said first and second rotors of said clutch motor and regulating rotation of said second rotor relative to said first rotor;

an assist motor connected with said drive shaft;

an assist motor-driving circuit for driving and controlling said assist motor;

a storage battery being charged with power regenerated by said clutch motor via said clutch motor-driving circuit, being charged with power regenerated by said assist motor via said assist motor-driving circuit, discharging power required to drive said clutch motor via said clutch motor-driving circuit, and discharging power required to drive said assist motor via said assist motor-driving circuit;

starter position detecting means for detecting an ignition switch in a starter position;

starter control means for, when said starter position detecting means detects said ignition switch in said starter position, setting said drive shaft into a locking state and controlling said clutch motor-driving circuit to allow said clutch motor to crank said output shaft of said engine with the power stored in said storage battery; and engine operation control means for injecting a fuel into said engine and igniting a spark in said engine concurrently with the cranking operation by said starter control means.

2. A power transmitting apparatus in accordance with claim 1, wherein said starter control means comprises means for setting said drive shaft into the locking state by locking up said assist motor with the power stored in said storage battery.

3. A power transmitting apparatus in accordance with claim 1, wherein said starter control means comprises means for utilizing the power stored in said storage battery to make said assist motor output a torque, which is substantially equivalent to a torque applied from said clutch motor to said output shaft of said engine, to said drive shaft concomitantly by the cranking operation, thereby setting said drive shaft into the locking state.

4. A power transmitting apparatus for starting an engine and transmitting power output from said engine to a drive shaft, said power transmitting apparatus comprising:

- a complex motor comprising a first rotor connected with an output shaft of said engine, a second rotor connected with said drive shaft being coaxial to and rotatable relative to said first rotor, and a stator for rotating said second rotor, said first rotor and said second rotor constituting a first motor, said second rotor and said stator constituting a second motor;
- a first motor-driving circuit for driving and controlling said first motor in said complex motor;
- a second motor-driving circuit for driving and controlling said second motor in said complex motor;
- a storage battery being charged with power regenerated by said first motor via said first motor-driving circuit, being charged with power regenerated by said second motor via said second motor-driving circuit, discharging power required to drive said first motor via said first motor-driving circuit, and discharging power required to drive said second motor via said second motor-driving circuit;
- starter position detecting means for detecting an ignition switch in a starter position;
- starter control means for, when said starter position detecting means detects said ignition switch in said starter position, setting said drive shaft into a locking state and controlling said first motor-driving circuit to allow said first motor to crank said output shaft of said engine with the power stored in said storage battery; and
- engine operation control means for injecting a fuel into said engine and igniting a spark in said engine concurrently with the cranking operation by said starter control means.

5. A power transmitting apparatus for starting an engine and transmitting power output from said engine to a drive shaft, said power transmitting apparatus comprising:

- a clutch motor comprising a first rotor connected with an output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors;
- a clutch motor-driving circuit for controlling a degree of the electromagnetic connection of said first and second rotors of said clutch motor and regulating rotation of said second rotor relative to said first rotor;
- an assist motor connected with said drive shaft;
- an assist motor-driving circuit for driving and controlling said assist motor;
- a storage battery being charged with power regenerated by said clutch motor via said clutch motor-driving circuit, being charged with power regenerated by said assist motor via said assist motor-driving circuit, discharging power required to drive said clutch motor via said clutch motor-driving circuit, and discharging power required to drive said assist motor via said assist motor-driving circuit;
- a clutch mounted on said drive shaft to receive an output of said assist motor, said clutch connecting and disconnecting transmission of the output;
- starter position detecting means for detecting an ignition switch in a starter position;
- cranking control means for, when said starter position detecting means detects said ignition switch in said starter position, releasing the connection of said clutch, controlling said assist motor-driving circuit to enable said assist motor to output a torque to said drive shaft with the power stored in said storage battery, and controlling said clutch motor-driving circuit to enable said clutch motor to transmit the torque, which is output from said assist motor to said drive shaft, to said output shaft of said engine and thereby cranking said output shaft of said engine; and
- engine operation control means for injecting a fuel into said engine and igniting a spark in said engine concurrently with the cranking operation by said cranking control means.

6. A power transmitting apparatus in accordance with claim 5, wherein said cranking control means comprises means for locking up said clutch motor to transmit the torque output from said assist motor to said output shaft of said engine.

7. A power transmitting apparatus for starting an engine and transmitting power output from said engine to a drive shaft, said power transmitting apparatus comprising:

- a complex motor comprising a first rotor connected with an output shaft of said engine, a second rotor connected with said drive shaft being coaxial to and rotatable relative to said first rotor, and a stator for rotating said second rotor, said first rotor and said second rotor constituting a first motor, said second rotor and said stator constituting a second motor;
- a first motor-driving circuit for driving and controlling said first motor in said complex motor;
- a second motor-driving circuit for driving and controlling said second motor in said complex motor;
- a storage battery being charged with power regenerated by said first motor via said first motor-driving circuit, being charged with power regenerated by said second motor via said second motor-driving circuit, discharging power required to drive said first motor via said first motor-driving circuit, and discharging power required to drive said second motor via said second motor-driving circuit;
- a clutch mounted on said drive shaft to receive an output of said complex motor, said clutch connecting and disconnecting transmission of the output;
- starter position detecting means for detecting an ignition switch in a starter position;
- cranking control means for, when said starter position detecting means detects said ignition switch in said starter position, releasing the connection of said clutch, controlling said second motor-driving circuit to enable said second motor to output a torque to said drive shaft with the power stored in said storage battery, and controlling said first motor-driving circuit to enable said first motor to transmit the torque, which is output from said second motor to said drive shaft, to said output shaft of said engine and thereby cranking said output shaft of said engine; and engine operation control means for injecting a fuel into said engine and igniting a spark in said engine concurrently with the cranking operation by said cranking control means.

8. A power transmitting apparatus for starting an engine and transmitting power output from said engine to a drive shaft, said power transmitting apparatus comprising:

a clutch motor comprising a first rotor connected with an output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors;

a clutch motor-driving circuit for controlling a degree of the electromagnetic connection of said first and second rotors of said clutch motor and regulating rotation of said second rotor relative to said first rotor;

an assist motor connected with said drive shaft;

an assist motor-driving circuit for driving and controlling said assist motor;

a storage battery being charged with power regenerated by said clutch motor via said clutch motor-driving circuit, being charged with power regenerated by said assist motor via said assist motor-driving circuit, discharging power required to drive said clutch motor via said clutch motor-driving circuit, and discharging power required to drive said assist motor via said assist motor-driving circuit;

cranking control means for controlling said clutch motor-driving circuit to allow said clutch motor to crank said output shaft of said engine with the power stored in said storage battery, in response to an engine start signal which said cranking control means receives while said assist motor is driving and rotating said drive shaft with the power stored in said storage battery under a non-driving condition of said engine;

power increase means for controlling said assist motor-driving circuit to increase additional power supplied from said assist motor to said drive shaft by an amount corresponding to a torque substantially equivalent to a torque applied from said clutch motor to said output shaft of said engine, concurrently with the cranking operation by said cranking control means; and engine operation control means for injecting a fuel into said engine and igniting a spark in said engine concurrently with the cranking operation by said cranking control means.

9. A power transmitting apparatus for starting an engine and transmitting power output from said engine to a drive shaft, said power transmitting apparatus comprising:

a complex motor comprising a first rotor connected with an output shaft of said engine, a second rotor connected with said drive shaft being coaxial to and rotatable relative to said first rotor, and a stator for rotating said second rotor, said first rotor and said second rotor constituting a first motor, said second rotor and said stator constituting a second motor;

a first motor-driving circuit for driving and controlling said first motor in said complex motor;

a second motor-driving circuit for driving and controlling said second motor in said complex motor;

a storage battery being charged with power regenerated by said first motor via said first motor-driving circuit, being charged with power regenerated by said second motor via said second motor-driving circuit, discharging power required to drive said first motor via said first motor-driving circuit, and discharging power required to drive said second motor via said second motor-driving circuit;

cranking control means for controlling said first motor-driving circuit to allow said first motor to crank said output shaft of said engine with the power stored in said storage battery, in response to an engine start signal which said cranking control means receives while said second motor is driving and rotating said drive shaft with the power stored in said storage battery under a non-driving condition of said engine;

power increase means for controlling said second motor-driving circuit to increase additional power supplied from said second motor to said drive shaft by an amount corresponding to a torque substantially equivalent to a torque applied from said first motor to said output shaft of said engine, concurrently with the cranking operation by said cranking control means; and engine operation control means for injecting a fuel into said engine and igniting a spark in said engine concurrently with the cranking operation by said cranking control means.

10. A power transmitting apparatus for starting an engine and transmitting power output from said engine to a drive shaft, said power transmitting apparatus comprising:

a clutch motor comprising a first rotor connected with an output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors;

a clutch motor-driving circuit for controlling a degree of the electromagnetic connection of said first and second rotors of said clutch motor and regulating rotation of said second rotor relative to said first rotor;

an assist motor connected with said output shaft of said engine;

an assist motor-driving circuit for driving and controlling said assist motor;

a storage battery being charged with power regenerated by said clutch motor via said clutch motor-driving circuit, being charged with power regenerated by said assist motor via said assist motor-driving circuit, discharging power required to drive said clutch motor via said clutch motor-driving circuit, and discharging power required to drive said assist motor via said assist motor-driving circuit;

starter position detecting means for detecting an ignition switch in a starter position;

starter control means for, when said starter position detecting means detects said ignition switch in said starter position, controlling said assist motor-driving circuit to allow said assist motor to crank said output shaft of said engine with the power stored in said storage battery; and engine operation control means for injecting a fuel into said engine and igniting a spark in said engine concurrently with the cranking operation by said starter control means.

11. A power transmitting apparatus for starting an engine and transmitting power output from said engine to a drive shaft, said power transmitting apparatus comprising:

a complex motor comprising a first rotor connected with an output shaft of said engine, a second rotor connected with said drive shaft being coaxial to and rotatable relative to said first rotor, and a stator for rotating said second rotor, said first rotor and said second rotor constituting a first motor, said first rotor and said stator constituting a second motor;

a first motor-driving circuit for driving and controlling said first motor in said complex motor;

a second motor-driving circuit for driving and controlling said second motor in said complex motor;

a storage battery being charged with power regenerated by said first motor via said first motor-driving circuit, being charged with power regenerated by said second motor via said second motor-driving circuit, discharging power required to drive said first motor via said first motor-driving circuit, and discharging power required to drive said second motor via said second motor-driving circuit;

starter position detecting means for detecting an ignition switch in a starter position;

starter control means for, when said starter position detecting means detects said ignition switch in said starter position, controlling said second motor-driving circuit to allow said second motor to crank said output shaft of said engine with the power stored in said storage battery; and engine operation control means for injecting a fuel into said engine and igniting a spark in said engine concurrently with the cranking operation by said starter control means.

12. A power transmitting apparatus for starting an engine and transmitting power output from said engine to a drive shaft, said power transmitting apparatus comprising:

a clutch motor comprising a first rotor connected with an output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors;

a clutch motor-driving circuit for controlling a degree of the electromagnetic connection of said first and second rotors of said clutch motor and regulating rotation of said second rotor relative to said first rotor;

an assist motor connected with said output shaft of said engine;

an assist motor-driving circuit for driving and controlling said assist motor;

a storage battery being charged with power regenerated by said clutch motor via said clutch motor-driving circuit, being charged with power regenerated by said assist motor via said assist motor-driving circuit, discharging power required to drive said clutch motor via said clutch motor-driving circuit, and discharging power required to drive said assist motor via said assist motor-driving circuit;

lock means for setting said drive shaft into a locking state;

starter position detecting means for detecting an ignition switch in a starter position;

cranking control means for, when said starter position detecting means detects said ignition switch in said starter position, activating said lock means to set said drive shaft into the locking state and controlling said clutch motor-driving circuit to allow said clutch motor to crank said output shaft of said engine with the power stored in said storage battery; and engine operation control means for injecting a fuel into said engine and igniting a spark in said engine concurrently with the cranking operation by said cranking control means.

13. A power transmitting apparatus for starting an engine and transmitting power output from said engine to a drive shaft, said power transmitting apparatus comprising:

a complex motor comprising a first rotor connected with an output shaft of said engine, a second rotor connected with said drive shaft being coaxial to and rotatable relative to said first rotor, and a stator for rotating said second rotor, said first rotor and said second rotor constituting a first motor while said first rotor and said stator constituting a second motor;

a first motor-driving circuit for driving and controlling said first motor in said complex motor;

a second motor-driving circuit for driving and controlling said second motor in said complex motor;

a storage battery being charged with power regenerated by said first motor via said first motor-driving circuit, being charged with power regenerated by said second motor via said second motor-driving circuit, discharging power required to drive said first motor via said first motor-driving circuit, and discharging power required to drive said second motor via said second motor-driving circuit;

lock means for setting said drive shaft into a locking state;

starter position detecting means for detecting an ignition switch in a starter position;

cranking control means for, when said starter position detecting means detects said ignition switch in said starter position, activating said lock means to set said drive shaft into the locking state and controlling said first motor-driving circuit to allow said first motor to crank said output shaft of said engine with the power stored in said storage battery; and engine operation control means for injecting a fuel into said engine and igniting a spark in said engine concurrently with the cranking operation by said cranking control means.

14. A power transmitting apparatus for starting an engine and transmitting power output from said engine to a drive shaft, said power transmitting apparatus comprising:

a clutch motor comprising a first rotor connected with an output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors;

a clutch motor-driving circuit for controlling a degree of the electromagnetic connection of said first and second rotors of said clutch motor and regulating rotation of said second rotor relative to said first rotor;

an assist motor connected with said output shaft of said engine;

an assist motor-driving circuit for driving and controlling said assist motor;

a storage battery being charged with power regenerated by said clutch motor via said clutch motor-driving circuit, being charged with power regenerated by said assist motor via said assist motor-driving circuit, discharging power required to drive said clutch motor via said clutch motor-driving circuit, and discharging power required to drive said assist motor via said assist motor-driving circuit;

engine stop-time driving control means for controlling said assist motor-driving circuit to allow said assist motor to lock said output shaft of said engine with the power stored in said storage battery, and controlling said clutch motor-driving circuit to allow said clutch motor to drive and rotate said drive shaft with the power stored in said storage battery, thereby driving and rotating said drive shaft under a non-driving condition of said engine;

cranking control means for controlling said assist motor-driving circuit to allow said assist motor to crank said output shaft of said engine with the power stored in said storage battery, in place of the control of said assist motor-driving circuit by said engine stop-time driving control means, in response to an engine start signal which said cranking control means receives during the course of the control by said engine stop-time driving control means; and engine operation control means for injecting a fuel into said engine and igniting a spark in said engine concurrently with the cranking operation by said cranking control means.

15. A power transmitting apparatus for starting an engine and transmitting power output from said engine to a drive shaft, said power transmitting apparatus comprising:

a complex motor comprising a first rotor connected with an output shaft of said engine, a second rotor connected with said drive shaft being coaxial to and rotatable relative to said first rotor, and a stator for rotating said second rotor, said first rotor and said second rotor constituting a first motor while said first rotor and said stator constituting a second motor;

a first motor-driving circuit for driving and controlling said first motor in said complex motor;

a second motor-driving circuit for driving and controlling said second motor in said complex motor;

a storage battery being charged with power regenerated by said first motor via said first motor-driving circuit, being charged with power regenerated by said second motor via said second motor-driving circuit, discharging power required to drive said first motor via said first motor-driving circuit, and discharging power required to drive said second motor via said second motor-driving circuit;

engine stop-time driving control means for controlling said second motor-driving circuit to allow said second motor to lock said output shaft of said engine with the power stored in said storage battery, and controlling said first motor-driving circuit to allow said first motor to drive and rotate said drive shaft with the power stored in said storage battery, thereby driving and rotating said drive shaft under a non-driving condition of said engine;

cranking control means for controlling said second motor-driving circuit to allow said second motor to crank said output shaft of said engine with the power stored in said storage battery, in place of the control of said second motor-driving circuit by said engine stop-time driving control means, in response to an engine start signal which said cranking control means receives during the course of the control by said engine stop-time driving control means; and engine operation control means for injecting a fuel into said engine and igniting a spark in said engine concurrently with the cranking operation by said cranking control means.

16. A method of controlling power transmitting apparatus for transmitting power output from an engine to a drive shaft, said power transmitting apparatus including:

a clutch motor comprising a first rotor connected with an output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors; an assist motor connected with said drive shaft; a storage battery being charged with power regenerated by said clutch motor, being charged with power regenerated by said assist motor, discharging power required to drive said clutch motor, and discharging power required to drive said assist motor; and an engine operation means for injecting a fuel into said engine and igniting a spark in said engine;

said method comprising the steps of:
 (a) detecting an ignition switch in a starter position;
 (b) setting said drive shaft into a locking state when the ignition switch is detected in the starter position;
 (c) cranking said output shaft of said engine by said clutch motor with the power stored in said storage battery; and
 (d) controlling the fuel injection into said engine and the spark ignition in said engine via said engine operation means concurrently with the cranking operation of said step (c).

17. A method of controlling power transmitting apparatus for transmitting power output from an engine to a drive shaft, said power transmitting apparatus including:

a clutch motor comprising a first rotor connected with said output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors; an assist motor connected with said drive shaft; a storage battery being charged with power regenerated by said clutch motor, being charged with power regenerated by said assist motor, discharging power required to drive said clutch motor, and discharging power required to drive said assist motor; an engine operation means for injecting a fuel into said engine and igniting a spark in said engine; and a clutch mounted on said drive shaft to receive an output of said assist motor, said clutch connecting and disconnecting transmission of the output;

said method comprising the steps of:
(a) detecting an ignition switch in a starter position;
(b) releasing the connection of said clutch when the ignition switch is detected in the starter position;
(c) controlling said assist motor to output a torque to said drive shaft with the power stored in said storage battery;
(d) controlling said clutch motor to transmit the torque, which is output from said assist motor to said drive shaft, to said output shaft of said engine and thereby cranking said output shaft of said engine; and
(e) controlling the fuel injection into said engine and the spark ignition in said engine via said engine operation means concurrently with the cranking operation of said step (d).

18. A method of controlling power transmitting apparatus for transmitting power output from an engine to a drive shaft, said power transmitting apparatus including:

a clutch motor comprising a first rotor connected with said output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors; an assist motor connected with said drive shaft; a storage battery being charged with power regenerated by said clutch motor, being charged with power regenerated by said assist motor, discharging power required to drive said clutch motor, and discharging power required to drive said assist motor; and an engine operation means for injecting a fuel into said engine and igniting a spark in said engine;

said method comprising the steps of:
(a) cranking said output shaft of said engine by said clutch motor with the power stored in said storage battery, when an engine start signal is detected while said assist motor is driving and rotating said drive shaft with the power stored in said storage battery under a non-driving condition of said engine;
(b) increasing additional power supplied from said assist motor to said drive shaft by an amount corresponding to a torque substantially equivalent to a torque applied from said clutch motor to said output shaft of said engine, concurrently with the cranking operation of said step (a); and
(c) controlling the fuel injection into said engine and the spark ignition in said engine via said engine operation means concurrently with the cranking operation of said step (a).

* * * * *